United States Patent
Saitto

(10) Patent No.: US 12,204,010 B2
(45) Date of Patent: Jan. 21, 2025

(54) MULTISTATIC RADAR SYSTEM AND METHOD OF OPERATION THEREOF FOR DETECTING AND TRACKING MOVING TARGETS, IN PARTICULAR UNMANNED AERIAL VEHICLES

(71) Applicant: GPM 3 S.R.L., Rome (IT)

(72) Inventor: Antonio Saitto, Rome (IT)

(73) Assignee: GPM 3 S.R.L., Rome (IT)

( * ) Notice: Subject to any disclaimer, the term of this patent is extended or adjusted under 35 U.S.C. 154(b) by 432 days.

(21) Appl. No.: 17/617,543

(22) PCT Filed: Jun. 4, 2020

(86) PCT No.: PCT/IB2020/055281
§ 371 (c)(1),
(2) Date: Dec. 8, 2021

(87) PCT Pub. No.: WO2020/250093
PCT Pub. Date: Dec. 17, 2020

(65) Prior Publication Data
US 2022/0260697 A1    Aug. 18, 2022

(30) Foreign Application Priority Data

Jun. 11, 2019 (EP) .................................. 19425042
Nov. 7, 2019 (EP) .................................. 19425079

(51) Int. Cl.
*G01S 13/00* (2006.01)
*G01S 13/72* (2006.01)
(Continued)

(52) U.S. Cl.
CPC .......... *G01S 13/003* (2013.01); *G01S 13/726* (2013.01); *G01S 13/867* (2013.01); *G01S 13/92* (2013.01); *G04R 20/02* (2013.01)

(58) Field of Classification Search
CPC .... G01S 13/003; G01S 13/726; G01S 13/867; G01S 13/92; G04R 20/02
See application file for complete search history.

(56) References Cited

U.S. PATENT DOCUMENTS

| | | | |
|---|---|---|---|
| 7,994,965 B2 * | 8/2011 | Longstaff | G01S 13/003 |
| | | | 342/158 |
| 10,557,916 B2 | 2/2020 | Hafizovic et al. | |
| 10,620,304 B2 * | 4/2020 | Halbert | G01S 7/003 |

(Continued)

FOREIGN PATENT DOCUMENTS

WO    WO 2017/205874 A1    11/2017
WO    WO 2017/207718 A1    12/2017

OTHER PUBLICATIONS

PCT International Search Report and Written Opinion dated Sep. 10, 2020 for PCT Application No. PCT/IB2020/055281.
PCT/IB2020/055281, Jun. 4, 2020, WO 2020/250093.

*Primary Examiner* — Timothy A Brainard
*Assistant Examiner* — Kenneth W Good
(74) *Attorney, Agent, or Firm* — McCarter & English, LLP

(57) ABSTRACT

A multistatic radar system is provided for detecting and tracking targets moving in a surveillance area that includes: a radar transmitter and a plurality of radar receivers located in different positions in the surveillance area and processing means. The radar transmitter and the radar receivers are configured to obtain a GNSS-based time reference based on the GNSS signals received by the respective GNSS receiver. Each radar receiver is configured to determine, for each radar echo received by the radar receiver from a respective target, a corresponding distance-related information item based on the predefined transmission time and frequency pattern, the GNSS-based time reference and a respective reception time of the radar echo, and to provide the processing means with data indicative of the distance-related (Continued)

information items and the Doppler frequencies determined by the radar receiver, and reference times associated with the distance-related information items and the Doppler frequencies.

23 Claims, 8 Drawing Sheets

(51) Int. Cl.
  *G01S 13/86* (2006.01)
  *G01S 13/92* (2006.01)
  *G04R 20/02* (2013.01)

(56) References Cited

U.S. PATENT DOCUMENTS

| | | | |
|---|---|---|---|
| 2001/0013839 A1* | 8/2001 | Wurman | G01S 13/951 |
| | | | 342/26 R |
| 2003/0071751 A1 | 4/2003 | Barrick et al. | |
| 2004/0233105 A1* | 11/2004 | Benner | G01S 13/003 |
| | | | 342/451 |
| 2005/0275582 A1* | 12/2005 | Mohan | G01S 13/003 |
| | | | 342/27 |
| 2016/0069992 A1 | 3/2016 | Rector et al. | |
| 2017/0297712 A1 | 10/2017 | Kim et al. | |
| 2018/0003826 A1* | 1/2018 | Lacaze | G01S 13/878 |
| 2019/0077519 A1* | 3/2019 | Husain | B64F 1/222 |
| 2019/0242991 A1* | 8/2019 | Mansour | G01S 7/295 |
| 2020/0116855 A1* | 4/2020 | Jo | G01S 13/726 |
| 2020/0142046 A1* | 5/2020 | Ouderkirk | G01S 7/415 |
| 2020/0300965 A1* | 9/2020 | Wu | G01S 13/505 |
| 2021/0209453 A1* | 7/2021 | Meissner | G06N 3/04 |

* cited by examiner

- ● 1st transmission time and frequency pattern
- ◐ 2nd transmission time and frequency pattern
- ○ 3rd transmission time and frequency pattern
- ◎ 4th transmission time and frequency pattern

MULTISTATIC RADAR SYSTEM AND METHOD OF OPERATION THEREOF FOR DETECTING AND TRACKING MOVING TARGETS, IN PARTICULAR UNMANNED AERIAL VEHICLES

CROSS-REFERENCE TO RELATED APPLICATIONS

This application is a 35 U.S.C. § 371 National Stage filing of International Application No. PCT/IB2020/055281, filed on Jun. 4, 2020, which application claims priority from European Patent Applications No. 19425042.9 filed on Jun. 11, 2019, and Ser. No. 19/425,079.1 filed on Nov. 7, 2019, the entire disclosures of which are is incorporated herein by reference.

TECHNICAL FIELD OF THE INVENTION

The present invention relates, in general, to detection, tracking and monitoring of moving targets, preferably Unmanned (or Uncrewed) Aerial Vehicles (UAVs), namely aircraft and aerial vehicles that operate/fly with no pilot on board and that:
- are remotely piloted/operated/controlled by a pilot and/or a pilot station/system (commonly known as drones, Remotely Piloted Aircraft (RPA), Remotely Piloted Aerial Vehicles (RPAVs), Remotely Operated Aircraft (ROA), etc.); or
- operate/fly autonomously, i.e., without any pilot intervention; or
- have the capability to operate both in a remotely piloted/operated/controlled flight mode and in an autonomous flight mode.

More specifically, the present invention concerns a multistatic radar system and an innovative method of operation thereof for detecting and tracking moving targets, preferably UAVs of the above types, conveniently non-cooperative UAVs of the above types.

BACKGROUND ART

As is known, over the last years the availability of Unmanned Aerial Vehicles (UAVs) (in particular, Remotely Piloted Aircraft (RPA), such as multirotor (or multicopter) drones) of various types and sizes has dramatically increased, due to the decreasing cost of the technology that enables them to be flown without any need for particular skill and training. Such UAVs are often sold/bought as toys, but they are often capable of carrying payloads such as cameras or other relatively light objects. This capability makes them useful for transporting objects, or carrying out monitoring/surveillance tasks.

Unfortunately, UAVs can be also used for undesirable, hazardous or even illegal tasks. For example, undesirable uses of drones include incursions into protected airspace (e.g., at an airport) or sensitive/restricted areas (e.g., a nuclear plant, a prison or a military compound), due to simple inexperience, incautiousness or recklessness, or even with malicious or hostile intents (for example, in order carry out a terrorist attack).

Therefore, nowadays, it is felt the need for solutions enabling detection, tracking and monitoring of flying UAVs for security reasons, for example in order to detect dangerous or illegal activities performed by UAVs, or even UAV-related threats, so as to carry out appropriate countermeasures (e.g., early warning dispatching).

To this end, several systems for UAV detection and tracking have been proposed in recent years.

For example, U.S. Pat. No. 10,557,916 B2 discloses a system for detecting, classifying and tracking UAVs comprising:
- at least one microphone array arranged to provide audio data;
- at least one camera arranged to provide video data; and
- at least one processor arranged to generate a spatial detection probability map comprising a set of spatial cells.

According to U.S. Pat. No. 10,557,916 B2, the processor assigns a probability score to each cell as a function of:
- an audio analysis score generated by comparing audio data to a library of audio signatures;
- an audio intensity score generated by evaluating a power of at least a portion of a spectrum of the audio data; and
- a video analysis score generated by using an image processing algorithm to analyze the video data.

The system according to U.S. Pat. No. 10,557,916 B2 is arranged to indicate that a UAV has been detected in one or more spatial cells if the associated probability score exceeds a predetermined detection threshold.

Another example of known UAV detection system is disclosed in WO 2017/207718 A1, which concerns a drone detection radar that comprises a plurality of antenna systems, wherein each antenna system is arranged to transmit a signal into an associated sector, and to receive signals reflected from targets in the sector, and wherein the sectors collectively form a monitored volume. A subset of the antenna systems are active at any one time, with the active subset of antenna systems being arranged to monitor their respective volumes for a duration sufficient to measure Doppler signals associated with slow moving drones, and with the radar being arranged to switch to a different subset of antenna systems after each duration, such that the whole volume is monitored within a predetermined period.

Acoustic sensors can be useful at very close range, but their performance drastically deteriorates in noisy, urban environments.

Video systems (including infrared imaging systems) are useful for confirming the actual presence of a drone, but their performance worsens in visually cluttered environments, with bad weather and with darkness.

Additionally, video systems often have difficulty in detecting drones at long ranges (e.g., at distances of several tens of meters).

Instead, radar-based systems may provide the capability to detect UAVs at long ranges, but their performance can be adversely affected by the presence of clutter, electromagnetic interferences, multipath and false targets (e.g., birds), whereby their reliability could be liable to become extremely poor, especially in crowded environments, such as the urban ones.

OBJECT AND SUMMARY OF THE INVENTION

In view of the foregoing, the Applicant has felt the need to carry out an in-depth study in order to develop an improved solution for UAV detection and tracking, thereby conceiving the present invention.

In particular, an object of the present invention is that of providing a radar system and an innovative method of operation thereof for detecting and tracking moving targets such as flying UAVs, with improved performance and features with respect to those of currently known radar-based solutions.

This and other objects are achieved by the present invention in that it relates to a multistatic radar system for detecting and tracking moving targets, as defined in the appended claims.

BRIEF DESCRIPTION OF THE DRAWINGS

For a better understanding of the present invention, preferred embodiments, which are intended purely by way of non-limiting example, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

A first aspect of the present invention relates to a multistatic radar system for detecting and tracking moving targets, preferably Unmanned (or Uncrewed) Aerial Vehicles (UAVs) including aircraft and aerial vehicles that operate/fly with no pilot on board and that:
  are remotely piloted/operated/controlled by a pilot and/or a pilot station/system (commonly known as drones, Remotely Piloted Aircraft (RPA), Remotely Piloted Aerial Vehicles (RPAVs), Remotely Operated Aircraft (ROA), etc.); or
  operate/fly autonomously, i.e., without any pilot intervention; or
  have the capability to operate both in a remotely piloted/operated/controlled flight mode and in an autonomous flight mode.

Figure 1:
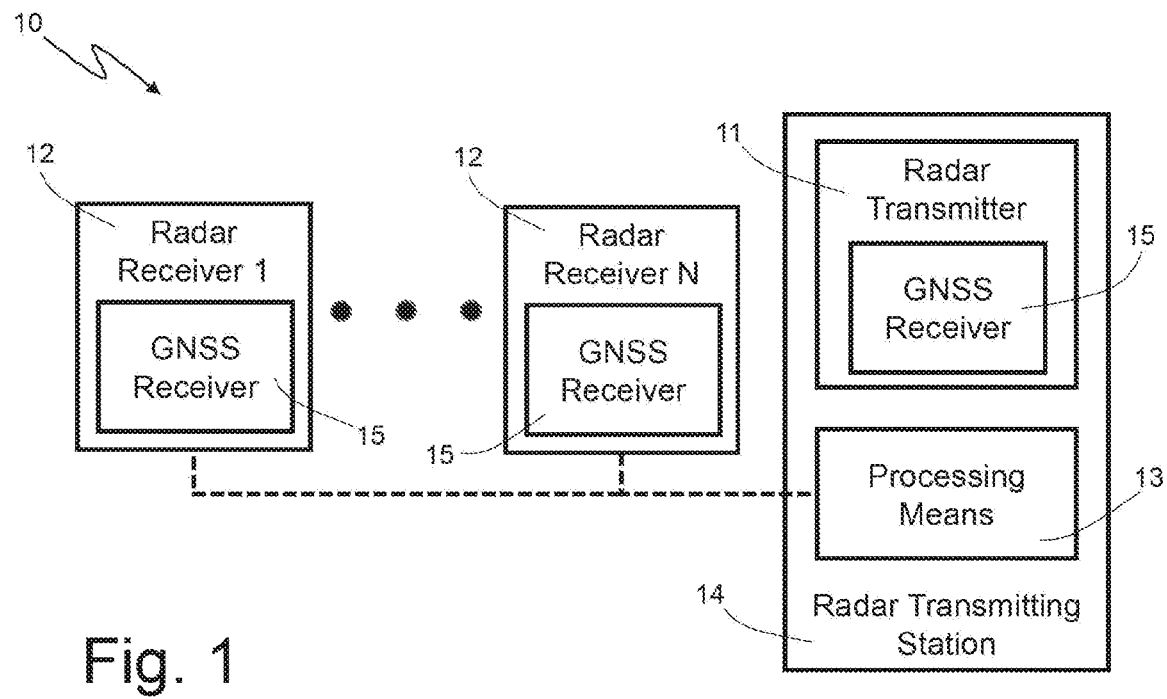
FIG. 1 schematically illustrates a multistatic radar system for detecting and tracking moving targets according to a preferred, non-limiting embodiment of a first aspect of the present invention.

For a better understanding of the first aspect of the present invention, FIG. 1 schematically illustrates (in particular, by means of a block diagram) a functional architecture of a multistatic radar system (denoted as a whole by 10) for detecting and tracking moving targets, preferably UAVs of the above types (conveniently, non-cooperative UAVs), according to a preferred, non-limiting embodiment of said first aspect of the present invention.

More specifically, the multistatic radar system 10 is designed to detect and track targets moving (preferably, UAVs flying) in a surveillance area (not shown in FIG. 1) and includes:
  a radar transmitter 11 and a plurality of radar receivers 12 arranged in different positions in said surveillance area; and
  processing means 13 conveniently configured to implement innovative computation/processing algorithms with improved computational time (in particular, requiring low computational time) that will be described in detail hereinafter.

Conveniently, the processing means 13 are integrated with the radar transmitter 11 into a radar transmitting station 14 and are connected, in a wireless and/or wired fashion, to the radar receivers 12 (e.g., via one or more wireless and/or wired networks and/or links, preferably based on Internet Protocol (IP)). In this case, the processing means 13 can be conveniently implemented by means of a processing device (e.g., a processor or a Field Programmable Gate Array (FPGA)) programmed by means of an appropriate software and/or firmware program to carry out the innovative computation/processing algorithms described hereinafter.

Alternatively, the processing means 13 can be conveniently arranged separately from the radar transmitter 11. In this case, the processing means 13 are remotely connected, in a wireless and/or wired fashion, to the radar transmitter 11 and to the radar receivers 12 (e.g., via one or more wireless and/or wired networks and/or links, preferably based on Internet Protocol (IP)). Moreover, in this case, the processing means 13 can be conveniently implemented by means of a processing device or system (e.g., a processor, or an FPGA, or a server, or a cloud computing system, etc.) programmed/configured to carry out the innovative computation/processing algorithms described hereinafter.

Figure 2:
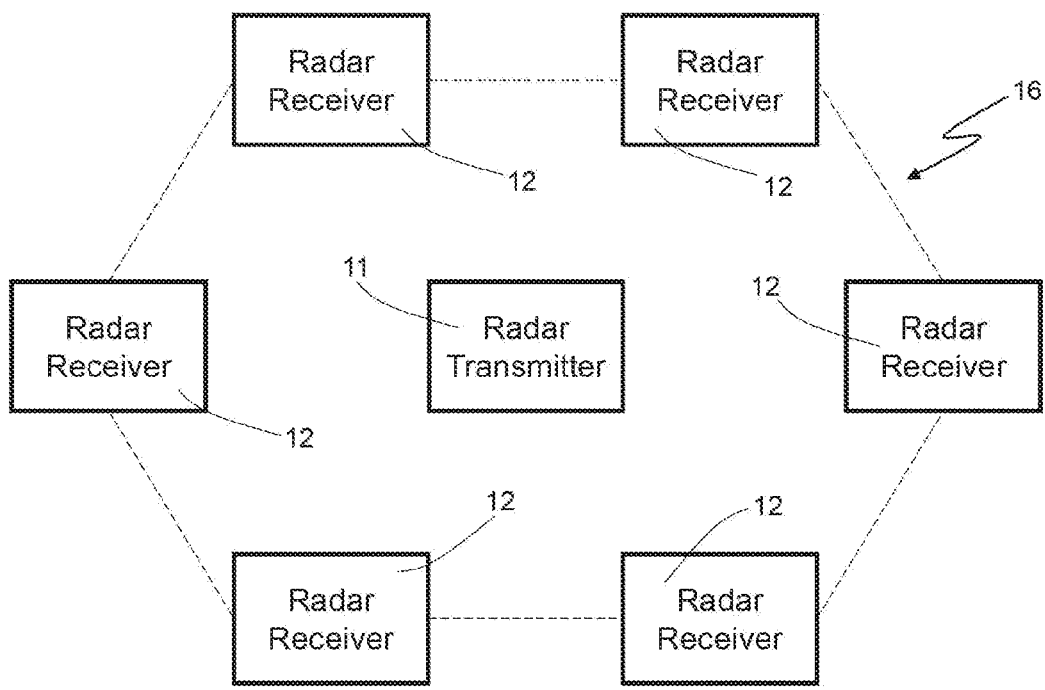
FIG. 2 schematically illustrates a non-limiting example of hexagonal surveillance area of the multistatic radar system of FIG. 1.

Conveniently, the multistatic radar system 10 comprises N radar receivers 12, wherein N is an integer greater than one (i.e., N>1). Preferably, N is equal to, or greater than, four (i.e., N≥4). More preferably, N is equal to, or greater than, six or eight (i.e., N≥6 or N≥8). Conveniently, said N radar receivers 12 are arranged around the radar transmitter 11 (or around the radar transmitting station 14) to form a perimeter (e.g., a hexagonal/octagonal/etc. perimeter) of the surveillance area, wherein the radar transmitter 11 (or the radar transmitting station 14) is conveniently arranged at a center of said surveillance area. In this connection, FIG. 2 shows a non-limiting example of hexagonal arrangement of N=6 radar receivers 12 around the radar transmitter 11 that is arranged at a center of a resultant hexagonal surveillance area 16.

The radar transmitter 11 and the radar receivers 12 include, each, a respective Global Navigation Satellite System (GNSS) receiver 15 configured to receive GNSS signals from one or more GNSSs (such as the Global Positioning System (GPS) and/or the Galileo system and/or the GLONASS system and/or the Beidou Navigation Satellite System, etc.).

In particular, the radar transmitter 11 and the radar receivers 12 are configured to obtain a GNSS-based time reference based on the GNSS signals received by the respective GNSS receiver 15 (in particular, based on GNSS time data carried by the received GNSS signals), wherein said GNSS-based time reference is common to said radar transmitter 11 and said radar receivers 12.

The radar transmitter 11 is configured to transmit radar signals according to a predefined transmission time and frequency pattern and on the basis of the GNSS-based time reference.

The radar receivers 12 are configured to receive radar echoes from one or more targets (not shown in FIGS. 1 and 2) moving (preferably, flying) in the surveillance area (for example, the hexagonal surveillance area 16 shown in FIG. 2) and illuminated by the radar signals transmitted by the radar transmitter 11.

Moreover, each radar receiver 12 is further configured to:
determine, for each radar echo received by said radar receiver 12 from a respective target,
  a corresponding distance-related information item based on the predefined transmission time and frequency pattern, the GNSS-based time reference and a respective reception time of said radar echo, wherein said corresponding distance-related information item is related to an overall distance from the radar transmitter 11 to the respective target and from said respective target to said radar receiver 12, and
  a corresponding Doppler frequency of said radar echo based on the predefined transmission time and frequency pattern and the GNSS-based time reference; and
provide the processing means 13 with
  data indicative of the distance-related information items and the Doppler frequencies determined by said radar receiver 12, and
  reference times associated with said distance-related information items and said Doppler frequencies, wherein said reference times are referenced to the GNSS-based time reference.

Conveniently, each radar receiver 12 is configured to determine, for each radar echo received by said radar receiver 12 from a respective target, a corresponding distance-related information item by computing, based on the predefined transmission time and frequency pattern, the GNSS-based time reference and a respective reception time of said radar echo, a respective transmission-reception time delay, wherein said corresponding distance-related information item is:
said respective transmission-reception time delay, or
an overall distance from the radar transmitter 11 to the respective target and from said respective target to said radar receiver 12, wherein said overall distance is computed based on said respective transmission-reception time delay.

Preferably, each radar receiver 12 is configured to provide the processing means 13 with the above data and reference times along with a respective identifier of said radar receiver 12.

Conveniently, the radar transmitter 11 and the radar receivers 12 are installed at fixed positions (e.g., on/at cell towers of one or more mobile phone cellular networks) and the processing means 13 are configured to store:
positions of the radar transmitter 11 and of the radar receivers 12 (in particular, of the transmitting and receiving antennas thereof); and
distances between said radar transmitter 11 and said radar receivers 12 (in particular, between the transmitting and receiving antennas thereof).

Alternatively, the radar transmitter 11 and the radar receivers 12 might be conveniently installed on mobile platforms (such as land vehicles, boats, ships, craft, aircraft, UAVs, helicopters, etc.) to be used in mobile operating scenarios. In this case, the radar transmitter 11 and the radar receivers 12 are conveniently configured to obtain their positions, each from the respective GNSS receiver 15, and to provide the processing means 13 also with time-referenced (i.e., temporally-referenced) positioning data indicative of their positions temporally referenced to the GNSS-based time reference.

Moreover, the processing means 13 are programmed/configured to perform:
a data selection step including selecting distance-related information items and Doppler frequencies that
  have been provided by different radar receivers 12 (preferably, by P different radar receivers 12, P being an integer comprised between three (or four) and N (i.e., $3 \leq P \leq N$, or $4 \leq P \leq N$)—as it will be explained hereinafter),
  are temporally corresponding (i.e., that correspond in time with each other)—conveniently, that are associated with one and the same reference time or with temporally corresponding reference times (e.g., that relate to one and the same transmission time) and
  relate to one and the same target;
a target position computation step including computing a three-dimensional (3D) position of said one and the same target (conveniently, a 3D position of said one and the same target with respect to the radar transmitter 11) based on
  the selected distance-related information items,
  the position of the radar transmitter 11, and
  the positions of, and the distances from the radar transmitter 11 of, the radar receivers 12 that have provided said selected distance-related information items; and
a target velocity computation step including computing a three-dimensional (3D) velocity of said one and the same target based on the computed three-dimensional position thereof and the selected Doppler frequencies (and, conveniently, also on the positions of the radar transmitter 11 and of the radar receivers 12 that have provided said selected Doppler frequencies).

Preferably, the data selection step is performed by the processing means 13 by:
selecting temporally-corresponding distance-related information items provided by different radar receivers 12;

defining a plurality of ellipsoids of revolution, each of which is
associated with a respective radar receiver 12 and a respective selected distance-related information item provided by said respective radar receiver 12, and
defined by rotation of a respective ellipse about its major axis, wherein said respective ellipse has a transmitting antenna of the radar transmitter 11 and a receiving antenna of said respective radar receiver 12 as foci, and is defined by a respective overall distance to which said respective selected distance-related information item is related; and
selecting, among the defined ellipsoids of revolution, a group of ellipsoids of revolution related to one and the same target.

It is worth noting that, if the radar receivers 12 determine the transmission-reception time delays and not also the corresponding overall distances (and, hence, provide the processing means 13 with the transmission-reception time delays and not with the corresponding overall distances), then the processing means 13 compute said corresponding overall distances based on the transmission-reception time delays provided by the radar receivers 12.

Moreover, if the radar transmitter 11 and the radar receivers 12 are installed at fixed positions, then the processing means 13 are conveniently programmed/configured to perform the data selection step, the target position computation step and the target velocity computation step based on the stored positions of, and the stored distances between, said radar transmitter 11 and said radar receivers 12 (in particular, the transmitting and receiving antennas thereof).

Otherwise, if the radar transmitter 11 and the radar receivers are installed on mobile platforms, then the processing means 13 are conveniently programmed/configured to:
determine time-referenced (i.e., temporally-referenced) distances between the radar transmitter 11 and the radar receivers 12 based on the time-referenced positioning data received from said radar transmitter 11 and said radar receivers 12; and
perform the data selection step, the target position computation step and the target velocity computation step based on the determined time-referenced distances between the radar transmitter 11 and the radar receivers 12, and the time-referenced positioning data received from said radar transmitter 11 and said radar receivers 12.

Conveniently, the processing means 13 are further configured to perform also:
a Kalman filtering step including applying a predefined Kalman filtering to the computed 3D position and velocity of said one and the same target, thereby obtaining refined 3D position and velocity of said one and the same target.

In this respect, it is worth noting that the Kalman filtering step allows increasing target detection accuracy and minimizing false alarm probability.

Preferably, the processing means 13 are further configured to perform also:
a target tracking step including tracking said one and the same target by carrying out the data selection step, the target position computation step and the target velocity computation step (and, conveniently, also the Kalman filtering step) based on temporally successive distance-related information items and Doppler frequencies (i.e., distance-related information items and Doppler frequencies that are successive in time—conveniently, that are associated with temporally successive reference times—e.g., that relate to temporally successive transmission times) related to said one and the same target.

Conveniently, the radar transmitter 11 can be further configured to provide the processing means 13 with data indicative of radar signal transmission times referenced to the GNSS-based time reference. In this case, the processing means 13 are conveniently programmed/configured to carry out the data selection step based on the radar signal transmission times provided by the radar transmitter 11 and the reference times received from the radar receivers 12. Moreover, in this case, the processing means 13 are preferably programmed/configured to carry out the target tracking step for successive radar signal transmission times and successive reference times.

Preferably, the processing means 13 are programmed/configured to carry out the data selection step, the target position computation step and the target velocity computation step (and, conveniently, also the Kalman filtering step and/or the target tracking step) for a plurality of targets detected by the radar receivers 12 in the surveillance area (for example, the hexagonal surveillance area 16 shown in FIG. 2).

Conveniently, the multistatic radar system 10 further comprises an identification system (not shown in FIG. 1) including a plurality of surveillance UAVs equipped with video capture devices (e.g., 4K video cameras). Moreover, the processing means 13 are conveniently programmed/configured to perform also:
a target identification step based on the computed 3D position(s) and/or velocity(ies) of one or more detected and/or tracked given targets (conveniently, if the computed 3D position(s) and/or velocity(ies) of one or more detected and/or tracked targets meets/meet first predefined alert conditions—for example, if one or more detected and/or tracked targets is/are approaching one or more protected/sensitive/restricted subareas of the surveillance area), wherein said target identification step includes
causing one or more surveillance UAVs to take off, reach the given target(s) and capture one or more videos thereof, and
carrying out identification and/or classification of said given target(s) based on the captured video(s).

In this way, the identification step can be performed in a simple and low-cost way, but very effective.

Preferably, the processing means 13 are further programmed/configured to perform also:
a countermeasure step including generating one or more alerts and/or activating one or more countermeasures (e.g., sending early warning messages to, and/or requesting rapid intervention of, the police, security forces, military forces, etc.).

Conveniently, the countermeasure step is performed if:
the computed 3D position(s) and/or velocity(ies) of one or more detected and/or tracked targets meets/meet second predefined alert conditions (for example, if one or more detected and/or tracked targets is/are about to enter one or more protected/sensitive/restricted subareas of the surveillance area); and/or
a result of a performed target identification step meets third predefined alert conditions (for example, if a potential or real UAV-related threat (e.g., a UAV carrying explosive means) has been detected/identified as a result of a performed target identification step).

Conveniently, the countermeasure step may include causing the one or more surveillance UAVs that have taken off and reached the given target(s) for performing the target identification step to force said given target(s) (in particular, UAVs) to land.

Figure 3:
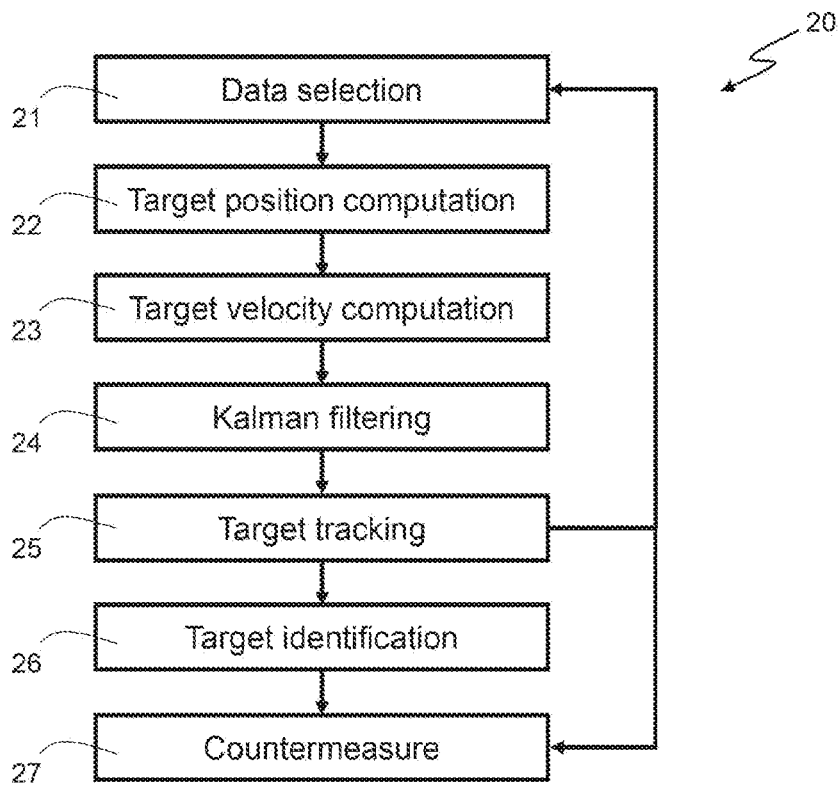
FIG. 3 schematically illustrates a method of operation of processing means of the multistatic radar system of FIG. 1 according to a preferred, non-limiting embodiment of the present invention.

In order to summarize the previously described operation of the processing means 13, FIG. 3 schematically illustrates (in particular, by means of a flowchart) a method of operation (denoted as a whole by 20) of said processing means 13 according to a preferred, non-limiting embodiment of the present invention.

In particular, said method of operation 20 includes:
said data selection step (block 21 in FIG. 3);
said target position computation step (block 22 in FIG. 3);
said target velocity computation step (block 23 in FIG. 3);
said Kalman filtering step (block 24 in FIG. 3);
said target tracking step (block 25 in FIG. 3);
said target identification step (block 26 in FIG. 3); and
said countermeasure step (block 27 in FIG. 3).

Conveniently, the radar transmitter 11 and the radar receivers 12 are configured to operate based on Continuous-Wave (CW) radar technology, preferably on Frequency-Modulated Continuous-Wave (FMCW) radar technology.

Alternatively, the radar transmitter 11 and the radar receivers 12 are conveniently configured to operate based on pulse radar technology, preferably Frequency-Modulated pulse radar technology.

Conveniently, the radar transmitter 11 is further configured to also receive radar echoes from one or more targets moving (preferably, flying) in the surveillance area (for example, the hexagonal surveillance area 16 shown in FIG. 2) and illuminated by the radar signals transmitted by said radar transmitter 11. In particular, in this case, the radar transmitter 11 is conveniently configured also to:
determine, for each radar echo received by said transmitter 11 from a respective target,
a corresponding distance-related information item based on the predefined transmission time and frequency pattern, the GNSS-based time reference and a respective reception time of said radar echo (and, conveniently, also a respective transmission time of the radar signal that has produced said respective radar echo), wherein said corresponding distance-related information item is related to a distance between the radar transmitter 11 and the respective target, and
a corresponding Doppler frequency of said radar echo based on the predefined transmission time and frequency pattern and the GNSS-based time reference; and
provide the processing means 13 with
data indicative of the distance-related information items and the Doppler frequencies determined by the radar transmitter 11, and
reference times associated with said distance-related information items and said Doppler frequencies, wherein said reference times are referenced to the GNSS-based time reference.

Conveniently, the radar transmitter 11 is configured to determine, for each radar echo received by said radar transmitter 11 from a respective target, a corresponding distance-related information item by computing, based on the predefined transmission time and frequency pattern, the GNSS-based time reference and a respective reception time of said radar echo (and, conveniently, also a respective transmission time of the radar signal that has produced said respective radar echo), a respective transmission-reception time delay, wherein said corresponding distance-related information item is:
said respective transmission-reception time delay, or
a distance between the radar transmitter 11 and the respective target computed based on said respective transmission-reception time delay.

Additionally, if the radar transmitter 11 is designed to operate also in reception, the processing means 13 are conveniently programmed/configured to carry out the data selection step (block 21 in FIG. 3), the target position computation step (block 22 in FIG. 3) and the target velocity computation step (block 23 in FIG. 3)—and, conveniently, also the Kalman filtering step (block 24 in FIG. 3) and/or the target tracking step (block 25 in FIG. 3)—also on the basis of the distance-related information items and the Doppler frequencies provided by said radar transmitter 11.

In this connection, it is worth noting that:
if the radar transmitter 11 and the radar receivers 12 are designed to operate based on pulse radar technology, then the radar transmitter 11 can conveniently transmit the radar signals and receive the radar echoes at different times, whereas
if the radar transmitter 11 and the radar receivers 12 are designed to operate based on CW radar technology, then the radar transmitter 11 is conveniently equipped with two co-located and electromagnetically insulated antennas, one operable in transmission and the other operable in reception.

As far as the predefined transmission time and frequency pattern is concerned, it is worth noting that said predefined transmission time and frequency pattern conveniently defines all time and frequency features of the radar signals transmitted, during operation, by the radar transmitter 11.

More specifically, the predefined transmission time and frequency pattern conveniently defines:
transmission times referenced to the GNSS-based time reference at which the radar transmitter 11 has to transmit (and, hence, during operation, transmits) the radar signals;
time period (i.e., duration) of the radar signals to be transmitted (and, hence, of the radar signals transmitted by the radar transmitter 11 during operation);
operating frequency or frequencies to be used by the radar transmitter 11 for the radar signals to be transmitted (and, hence, frequency/frequencies of the radar signals transmitted by the radar transmitter 11 during operation); and,
preferably, also frequency modulation features over the time period to be used by the radar transmitter 11 for the radar signals to be transmitted (and, hence, frequency modulation features over the time period of the radar signals transmitted by the radar transmitter 11 during operation).

For example, the radar transmitter 11 and the radar receivers 12 may conveniently store data indicative of the predefined transmission time and frequency pattern, or can be conveniently configured to execute a predefined function (e.g., a predefined software/firmware function) based on the GNSS-based time reference, which predefined function, when executed, provides said predefined transmission time and frequency pattern.

Therefore, thanks to the common GNSS-based time reference and the knowledge of the predefined transmission time and frequency pattern, the radar receivers 12 are able to determine the distance-related information items and the Doppler frequencies associated with the received radar echoes.

From the foregoing, it is immediately evident to those skilled in art that the multistatic radar system 10 can be advantageously used to effectively and reliably protect sensitive/restricted sites (such as airports, harbors, nuclear plants, prisons, military compounds, government buildings, etc.) against incautious, malicious or hostile incursions of UAVs.

Moreover, it is worth noting that the multistatic radar system 10 (in particular, the radar transmitter 11, the radar receivers 12 and the processing means 13) can be advantageously installed at fixed positions (e.g., on buildings, cell towers of one or more mobile phone cellular networks, etc.), but also on board mobile platforms (such as land vehicles, boats, ships, craft, aircraft, UAVs, helicopters, etc.) to protect said mobile platforms against incautious, malicious or hostile approaches of unknown UAVs.

More in general, the multistatic radar system 10 can be advantageously used to effectively and reliably detect and track targets of various types (e.g., UAVs, helicopters, land vehicles, ships, boats, craft, animals, etc.) moving in, or approaching, areas/regions of interest, such as cities, airports, harbors, nuclear plants, prisons, military compounds, government buildings, but also sea areas, coastal areas, desert areas, etc. For example, additional, advantageous (albeit non-limiting) uses of the multistatic radar system 10 may conveniently include monitoring of marine animals (such as marine mammals or fishes), monitoring of fish or mussel farming areas, monitoring of animal migrations, detection, tracking and monitoring of land vehicles moving in desert areas, detection, tracking and monitoring of ships/craft/boats approaching coastal areas, etc., by means of fixed or moving platforms (e.g., UAVs, helicopters, land vehicles, craft, ships, boats, etc.).

Additionally, it is important to stress the point that the multistatic radar system 10 is able to perform an effective and reliable, real-time, target detection and tracking thanks to the innovative processing/computation algorithms implemented by the processing means 13.

Furthermore, it is worth noting that the use of a GNSS-based time reference that is common to the radar transmitter 11 and all the radar receivers 12 enables (along with the use of the predefined transmission time and frequency pattern) an extremely accurate time and frequency synchronization thereof and, hence, a correct and straightforward signal processing (including distance-related information item and Doppler frequency determination, data selection and targets' position and velocity computation) without any need for additional time and frequency synchronization sources.

A second aspect of the present invention concerns a cellular radar system for detecting, tracking and monitoring targets moving (preferably, UAVs flying) in a surveillance region divided into cells, wherein in each cell a respective multistatic radar system is installed that has the main operating and geometrical features (and, conveniently, also the preferred operating and geometrical features) of the multistatic radar system 10 previously described and shown in FIG. 1 (and, conveniently, also in FIG. 2), whereby each cell corresponds to the surveillance area of said multistatic radar system 10 (for example, the hexagonal surveillance area 16 shown in FIG. 2).

Figure 4:
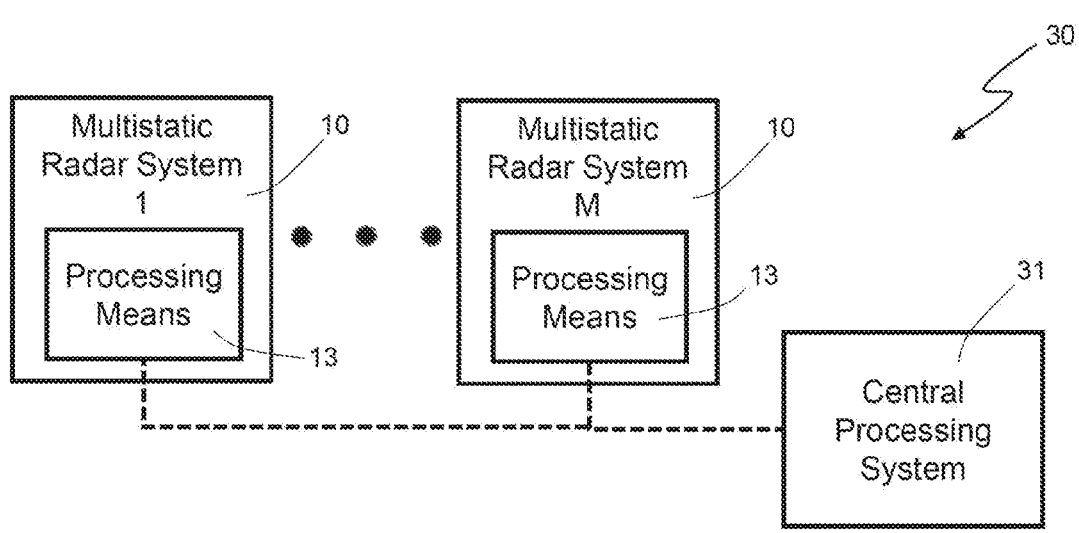
FIG. 4 schematically illustrates a cellular radar system for detecting, tracking and monitoring moving targets according to a preferred, non-limiting embodiment of a second aspect of the present invention.

For a better understanding of the second aspect of the present invention, FIG. 4 schematically illustrates (in particular, by means of a block diagram) a functional architecture of a cellular radar system (denoted as a whole by 30) according to a preferred, non-limiting embodiment of said second aspect of the present invention.

More specifically, the cellular radar system 30 is designed to detect, track and monitor targets moving (preferably, UAVs flying) in a surveillance region (not shown in FIG. 4) divided into M cells (wherein M is an integer greater than one—i.e., M>1), and includes:
  M multistatic radar systems 10, each installed in a respective cell; and
  a central processing system (or station) 31 remotely connected, in a wireless and/or wired fashion, to the processing means 13 of the M multistatic radar systems (e.g., via one or more wireless and/or wired networks and/or links, preferably based on Internet Protocol (IP)); wherein said central processing system 31 can be conveniently implemented by means of a processing device or system (e.g., one or more processors, or one or more servers, or a cloud computing system, etc.).

For each cell, the radar transmitter and receivers 11, 12 of the respective multistatic radar system 10 installed in said cell are conveniently configured to operate based on a respective predefined transmission time and frequency pattern that is different from the predefined transmission time and frequency patterns used by the multistatic radar systems 10 installed in neighboring cells.

Preferably, for each cell, the radar transmitter and receivers 11, 12 of the respective multistatic radar system 10 installed in said cell are configured to operate based on a respective predefined transmission time and frequency pattern that is different from the predefined transmission time and frequency patterns used by the multistatic radar systems 10 installed in cells immediately adjacent to said cell.

Conveniently, for each cell, the radar transmitter and receivers 11, 12 of the respective multistatic radar system 10 installed in said cell are configured to operate based on a respective predefined transmission time and frequency pattern that is different from the predefined transmission time and frequency patterns used by the M−1 multistatic radar systems 10 installed in the other M−1 cells.

Preferably, for each cell, one or more of the radar receivers 12 of the respective multistatic radar system 10 installed in said cell are configured to operate based on:
  the respective predefined transmission time and frequency pattern; and
  also one or more predefined transmission time and frequency patterns used by one or more multistatic radar systems 10 installed in one or more neighboring (conveniently, immediately adjacent) cells (whereby said one or more radar receivers 12 actually belong to two or more (partially) overlapped cells).

Figure 5:
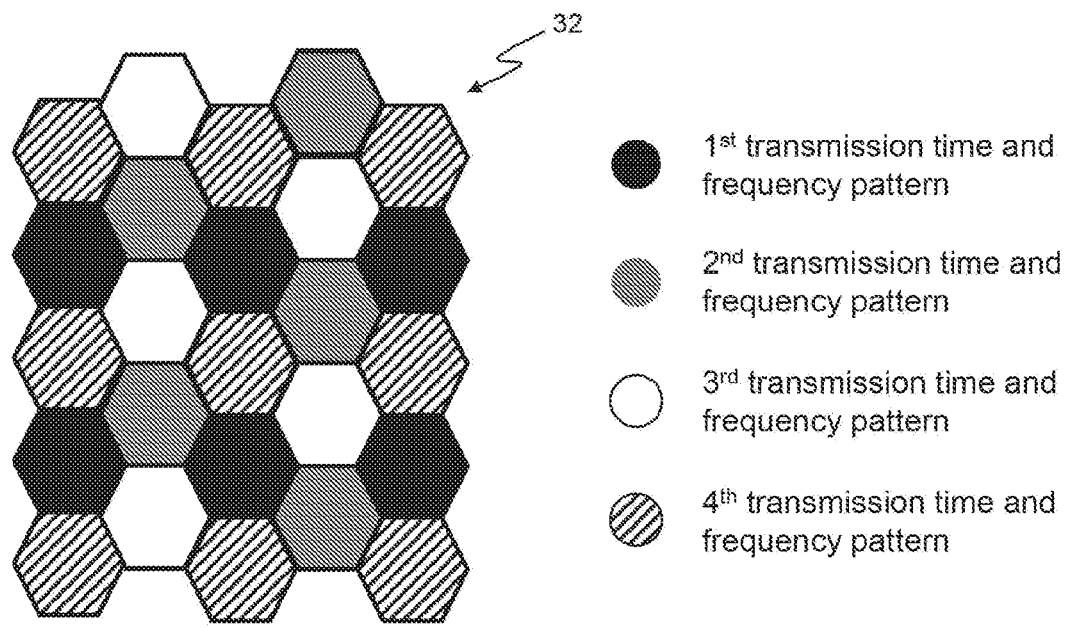
FIG. 5 schematically illustrates a non-limiting example of surveillance region of the cellular radar system of FIG. 4.

FIG. 5 shows a non-limiting example of surveillance region (denoted as a whole by 32) divided into twenty-five hexagonal cells (each corresponding, for example, to the hexagonal surveillance area 16 shown in FIG. 2), wherein:
  in each cell, a respective multistatic radar system 10 (not shown in FIG. 5) is installed;
  four different predefined transmission time and frequency patterns are, on the whole, used; and,
  for each cell, the respective multistatic radar system 10 installed in said cell uses a respective predefined transmission time and frequency pattern that is different from the predefined transmission time and frequency patterns used by the six multistatic radar systems 10 installed in the six immediately-adjacent cells.

The processing means 13 of the M multistatic radar systems 10 are configured to provide the central processing system 31 with detection and tracking data indicative of 3D positions and velocities of targets detected and tracked by said processing means 13 (i.e., by said M multistatic radar systems 10).

The central processing system 31 is configured to carry out based on the detection and tracking data provided by the processing means 13 of the M multistatic radar systems 10:
- a target monitoring step including monitoring all the targets detected and/or tracked by all the M multistatic radar systems 10;
- a cell handover step including managing handover of the detected and/or tracked targets between/among the multistatic radar systems 10 installed in different cells;
- conveniently, the target identification step previously described (block 26 in FIG. 3); and,
- preferably, the countermeasure step previously described (block 27 in FIG. 3).

Figure 6:
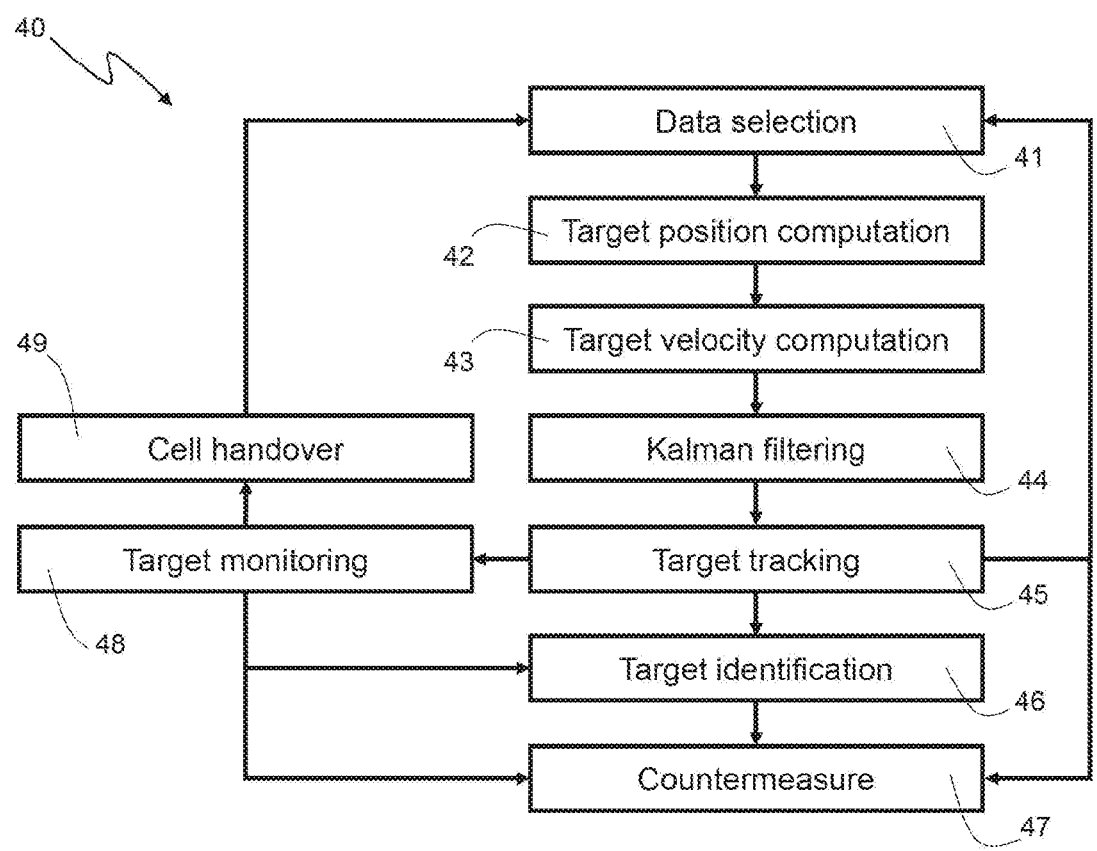
FIG. 6 schematically illustrates a method of operation of processing means and of a central processing system of the cellular radar system of FIG. 4 according to a preferred, non-limiting embodiment of the present invention.

In order to summarize the previously described operation, FIG. 6 schematically illustrates (in particular, by means of a flowchart) a method of operation (denoted as a whole by 40) of the processing means 13 of the M multistatic radar systems 10 and of the central processing system 31 according to a preferred, non-limiting embodiment of the present invention.

In particular, said method of operation 40 includes:
- the data selection step (block 41 in FIG. 6) performed by the processing means 13 of each of the M multistatic radar systems 10;
- the target position computation step (block 42 in FIG. 6) performed by the processing means 13 of each of the M multistatic radar systems 10;
- the target velocity computation step (block 43 in FIG. 6) performed by the processing means 13 of each of the M multistatic radar systems 10;
- the Kalman filtering step (block 44 in FIG. 6) performed by the processing means 13 of each of the M multistatic radar systems 10;
- the target tracking step (block 45 in FIG. 6) performed by the processing means 13 of each of the M multistatic radar systems 10;
- the target identification step (block 46 in FIG. 6) that can be carried out by the processing means 13 of each of the M multistatic radar systems 10 and also by the central processing system 31;
- the countermeasure step (block 47 in FIG. 6) that can be carried out by the processing means 13 of each of the M multistatic radar systems 10 and also by the central processing system 31;
- the target monitoring step (block 48 in FIG. 6) performed by the central processing system 31; and
- the cell handover step (block 49 in FIG. 6) performed by the central processing system 31.

From the foregoing, it is immediately evident to those skilled in art that also the cellular radar system 30 can be advantageously used to effectively and reliably protect sensitive/restricted sites (such as airports, harbors, nuclear plants, prisons, military compounds, government buildings, etc.) against incautious, malicious or hostile incursions of UAVs.

Additionally, it is worth noting that also the cellular radar system 30 can be can be advantageously exploited in both fixed and mobile operating scenarios.

More in general, the cellular radar system 30 allows spatially/geographically expanding detection, tracking and monitoring coverage of a single multistatic radar system 10. Thence, said cellular radar system 30 can be advantageously exploited for the same above uses as the multistatic radar system 10, but with a much wider spatial/geographical extent.

Furthermore, it is important to draw the attention to the fact that the cellular radar system 30 can be advantageously exploited to implement an effective and reliable national, regional or even continental UAV traffic control system that can be easily integrated with conventional Air Traffic Control (ATC) systems designed for aircraft (and also with system for detecting, tracking and monitoring cooperative UAVs).

For a better understanding of the present invention, several preferred (albeit absolutely non-limiting) features and examples of embodiments thereof will be described in detail in the following paragraphs, wherein the first three paragraphs relate to the innovative computation/processing algorithms performed by the processing means 13 (in particular, the target position computation step 22/42, the target velocity computation step 23/43 and the data selection step 21/41, respectively), whereas the four paragraphs after contain remarks concerning the use of FMCW radar technology, remarks concerning the use of pulse radar technology, remarks concerning radar transmitters and receivers, and closing remarks, respectively.

1. TARGET POSITION COMPUTATION

Figure 7:
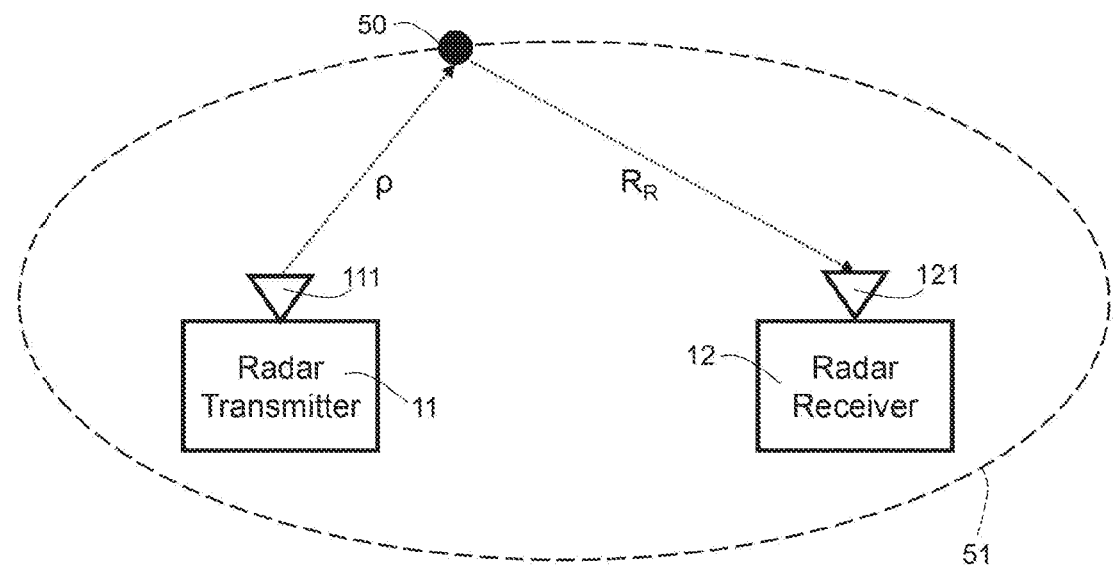
FIG. 7 schematically illustrates a first non-limiting example of operating scenario of a radar transmitter and a radar receiver of the multistatic radar system of FIG. 1 or the cellular radar system of FIG. 4.

As for the target position computation step (block 22 in FIG. 3 and block 42 in FIG. 6), reference is made to FIG. 7 that schematically illustrates the radar transmitter 11 of the multistatic radar system 10 (or of one of the M multistatic radar systems 10 of the cellular radar system 30) transmitting a radar signal by means of a transmitting antenna 111, whereby the transmitted radar signal reaches and illuminates a target 50 thereby producing a corresponding radar echo received (by means of a receiving antenna 121) by a radar receiver 12 of the multistatic radar system 10 (or of one of the M multistatic radar systems 10 of the cellular radar system 30).

In FIG. 7, a first path of the transmitted radar signal from the transmitting antenna 111 to the target 50 is represented by a first dotted arrow and has a first length $\rho$, whereas a second path of the radar echo from the target 50 to the receiving antenna 121 is represented by a second dotted arrow and has a second length $R_R$, whereby an overall path from said transmitting antenna 111 to said target 50 and from said target 50 to said receiving antenna 121 has an overall length $R=\rho+R_R$, wherein said overall length R can be determined as $R=c\Delta t$ (where c denotes the speed of light, while $\Delta t$ denotes the transmission-reception time delay determined by the radar receiver 12 and associated with the received radar echo).

The transmitting antenna 111 and the receiving antenna 121 represent the foci of an ellipse 51 such that, for each point thereof, the sum of the two respective distances to the foci (i.e., to the transmitting and receiving antennas 111, 121) is equal to R.

Said ellipse 51 defines a corresponding ellipsoid of revolution or spheroid (not shown in FIG. 7) obtained by rotating said ellipse 51 about its major axis extending through its foci (i.e., through the transmitting and receiving antennas 111, 112), wherein said ellipsoid of revolution is such that, for each point on its surface, the sum of the two respective distances to the transmitting and receiving antennas 111, 121 is equal to R.

Therefore, the target 50 is located on the surface of said ellipsoid of revolution.

Since the radar receiver 12 knows the transmission time of the radar signal transmitted by the radar transmitter 111 (thanks to the knowledge of the predefined transmission time and frequency pattern and the common GNSS-based time reference based on which both the radar transmitter and receiver 11, 12 operate), said radar receiver 12 is able to determine/compute the transmission-reception time delay Δt associated with the received echo signal (i.e., the delay between the transmission time of the radar signal and the reception time of the corresponding radar echo).

Therefore, said radar receiver 12 is able to:
compute/determine the transmission-reception time delay Δt associated with the echo signal received from the target 50 and provide the processing means 13 with said transmission-reception time delay Δt (wherein said processing means 13 compute/determine, based on said transmission-reception time delay Δt received from the radar receiver 12, the corresponding overall distance R (i.e., the overall length R of the overall path) from the transmitting antenna 111 to the target 50 and from said target 50 to the receiving antenna 121); or
compute/determine also the overall distance R based on the computed/determined transmission-reception time delay Δt and provide the processing means 13 with said overall distance R.

Considering P radar receivers that receive radar echoes from the target 50 for one and the same radar signal transmitted by the radar transmitter 11, it is possible to write the following equation for the $i^{th}$ ellipsoid of revolution (i.e., the ellipsoid of revolution defined by the ellipse having, as foci, the transmitting antenna 111 and the receiving antenna 121 of the $i^{th}$ radar receiver 12, wherein i is an index identifying the relevant radar receiver 12, with i=1, 2, ..., P):

$$xx_i + yy_i + zz_i - \rho R_i = 0.5(s_i^2 - R_i^2)$$

where
x,y,z denote the coordinates of the target 50 in a Cartesian reference system whose origin is located at the transmitting antenna 111 of the radar transmitter 11,
$x_i, y_i, z_i$ denote the coordinates of the receiving antenna 121 of the $i^{th}$ radar receiver 12 in said Cartesian reference system,
ρ denotes, as previously explained, the distance of the target 50 from the transmitting antenna 111 of the radar transmitter 11,
$R_i$ denotes the overall distance from the transmitting antenna 111 of the radar transmitter 11 to the target 50 and from said target 50 to the receiving antenna 121 of the $i^{th}$ radar receiver 12, and
$s_i$ denotes the distance between the receiving antenna 121 of the $i^{th}$ radar receiver 12 and the transmitting antenna 111 of the radar transmitter 11.

Therefore, taking account of the P radar receivers, it is possible to write the following linear equation system:

$$[x,y,z,\rho] = 0.5[[P_i;R_i]^T[P_i;R_i]]^{-1}[P_i;R_i]^T[s_i^2 - R_i^2] \quad (1)$$

where
$P_i = (x_i, y_i, z_i)$ denotes the position of the receiving antenna 121 of the $i^{th}$ radar receiver 12 in said Cartesian reference system (i.e., with respect to the transmitting antenna 111 of the radar transmitter 11),
$[\ ]^T$ denotes the transpose matrix,
$[\ ]^{-1}$ denotes the inverse matrix.

The unknowns in the above linear equation system (1) are the coordinates x,y,z of the target 50 and the distance ρ of the target 50 from the transmitting antenna 111 of the radar transmitter 11. Thence, taking P=4 or more radar receivers into account, it is possible to solve said linear equation system (1).

Moreover, once the four unknowns [x,y,z,ρ] have been computed, the following relation between ρ and x,y,z can be advantageously used to improve the accuracy of estimation of the height z of the target 50:

$$\rho = \sqrt{x^2 + y^2 + z^2}. \quad (2)$$

In this respect, it is important to note that the use of the additional equation (2) is very useful because it avoids the need for an iteration process for a quadratic equation system (that can be a complex task for a multistatic radar).

If the radar transmitter 11 is conveniently configured to operate also in reception (e.g., if pulse radar technology is conveniently used), the distance ρ of the target 50 from the transmitting antenna 111 of the radar transmitter 11 is no longer an unknown, but an observable that can be directly used in the linear equation system (1) (wherein, in this case, the three unknowns [x,y,z] can be found by taking P=3 or more radar receivers into account).

However, also in this case, the equation (2) can be conveniently used to improve the accuracy of estimation of the height z of the target 50.

As previously explained, the possibility of using the ρ-related equation (2) allows to exploit the linear equation system (1) that avoids any iteration procedure that, in case of a multistatic radar, can be rather slow, since there is no dominant variable among those ones under the square root (unlike, for example, the case of GNSS where the distance between satellite and Earth is much larger than the unknowns).

Additionally, it is worth noting that it is also possible to determine/compute/estimate the radar cross-section (RCS) of the target 50 based on the radar equation related to each $i^{th}$ radar receiver 12:

$$SNR_i = \frac{P_t G_t G_{ri} \lambda^2 \sigma}{(4\pi)^3 \rho^2 (R_i - \rho)^2 k T_i B F_i} B\tau \quad (3)$$

where
$SNR_i$ denotes the Signal-to-Noise Ratio determined by $i^{th}$ radar receiver 12,
$P_t$ denotes the transmission power used by the radar transmitter 11,
$G_t$ denotes the transmission gain of the transmitting antenna 111,
$G_{ri}$ denotes the reception gain of the receiving antenna 121 of the $i^{th}$ radar receiver 12,
λ denotes the used operating wavelength,
σ denotes the RCS of the target 50,
k denotes the Boltzmann constant,
$T_i$ denotes the noise temperature of the $i^{th}$ radar receiver 12,
B denotes radar signal frequency bandwidth,
$F_i$ denotes the noise factor of the $i^{th}$ radar receiver 12, and
τ denotes the pulse compression factor.

Therefore, since the RCS σ of the target 50 is the only unknown quantity in the equation (3), it is possible to solve such an equation (3) to find said RCS σ.

The computed RCS σ can be advantageously used to carry out classification of the target 50.

2. TARGET VELOCITY COMPUTATION

A 3D velocity of the target 50 can be determined/computed on the basis of the Doppler frequencies measured by the radar receivers 12.

In fact, since the target 50 is moving with velocity $[v_x, v_y, v_z]$, a typical Doppler effect occurs at each radar receiver 12, which can measure a respective Doppler-effect-related frequency shift (also commonly known as Doppler frequency).

In particular, thanks to the knowledge of the predefined transmission time and frequency pattern and the common GNSS-based time reference based on which the radar transmitter and receivers 11, 12 operate, each radar receiver 12 is able to measure a respective Doppler frequency. In this respect, it is worth noting that the use of the GNSS signals allows obtaining a common GNSS-based time reference for the whole multistatic radar system 10 with an accuracy of the order of 2 seconds in 300 million years. Therefore, a local clock with reasonably good Allan variance is conveniently sufficient to support the whole system synchronization (in particular, time and frequency synchronization) with an acceptable level meeting the required accuracy.

Each Doppler frequency is the result of two contributions:
- a first one that is common to all the paths and is related to the scalar product of the velocity vector of the target 50 and the unity vector associated with the straight line between the target 50 and the transmitting antenna 111; whereas
- a second contribution is specific to each radar receiver 12 and is related to the scalar product of the velocity vector of the target 50 and the unity vector associated with the straight line between the target 50 and the receiving antenna 121 of the considered radar receiver 12.

Considering the same Cartesian reference system already used for the target position computation (block 22 in FIG. 3 and block 42 in FIG. 6), it is possible to define an oversized linear equation system with the three unknowns of the velocity vector $v_x, v_y, v_z$.

In particular, for the target 50 (and, more in general, for each target) it is possible to write the following matrix relation:

$$[v_x, v_y, v_z] = [[a_{Rij} + a_{Tj}]^T [a_{Rij} + a_{Tj}]]^{-1} [a_{Rij} + a_{Tj}]^T [bf_i] \quad (4)$$

where
- $[v_x, v_y, v_z]$ denotes the unknown velocity vector of the target 50,
- i is, as in the linear equation system (1) and in the radar equation (3), an index identifying the relevant radar receiver 12 (with i=1, 2, . . . , P),
- j is an index identifying the relevant axis x,y,z of said Cartesian reference system whose origin is located at the transmitting antenna 111 of the radar transmitter 11,
- $a_{Rij}$ denotes the component along the $j^{th}$ axis of the unity vector associated with the straight line between the target 50 and the receiving antenna 121 of the $i^{th}$ radar receiver 12,
- $a_{Tj}$ denotes the component along the $j^{th}$ axis of the unity vector associated with the straight line between the target 50 and the transmitting antenna 111 of the radar transmitter 11;
- $[bf_i]$ denotes the observable vector of the Doppler frequencies measured by the radar receivers 12 multiplied by the transformation constant between Doppler frequency and velocity;
- $[\;]^T$ denotes the transpose matrix,
- $[\;]^{-1}$ denotes the inverse matrix.

Therefore, since the position of the target 50 is known (namely, has been computed based on the linear equation system (1) and the equation (2)), it is possible to compute the components $a_{Rij}$ and $a_{Tj}$ and, then, solve the linear equation system (4) based on said components $a_{Rij}$ and $a_{Tj}$, and the measured Doppler frequencies, thereby computing the velocity vector $[v_x, v_y, v_z]$ of the target 50.

3. DATA SELECTION CONVENIENTLY BASED ON ELLIPSOID GROUP SELECTION/IDENTIFICATION FOR EACH TARGET

The data selection step (block 21 in FIG. 3 and block 41 in FIG. 6) preferably includes identifying, for each target, a respective proper group of ellipsoids of revolution associated with said target in order to compute targets' 3D positions within surveillance area/cell volume.

In this respect, it is worth noting that the targets' position and velocity computation procedure described in the two foregoing paragraphs is conveniently performed once the ellipsoids of revolution have been conveniently associated with the proper targets, wherein this operation does not need to be very accurate, but sufficient to identify the proper groups of ellipsoids of revolution, leaving the accurate target detection to the solution of the linear equation system (1). In particular, in the following, a preferred (albeit non-limiting) embodiment of the data selection step (block 21 in FIG. 3 and block 41 in FIG. 6) will be described in detail, that is very original and powerful, and that has been conceived based on an algorithm which allows reducing the search strategy to a line search and not to a surface search, thereby achieving a reduction of at least two orders of magnitude in the computation time.

Each target is located at the intersection of all the ellipsoids of revolution that are associated with said target and that are obtained, each, by rotation of a respective ellipse that:
- has the transmitting antenna and the receiving antenna of a respective radar receiver as foci, and
- is defined by a respective overall distance corresponding to a respective transmission-reception time delay determined at said respective radar receiver, wherein the distance of the target from the transmitting antenna is the same for all the ellipsoids of revolution associated with said target, being the transmitting antenna a focus common to all said ellipsoids of revolution.

In order to perform the data selection step (block 21 in FIG. 3 and block 41 in FIG. 6), a spherical coordinate reference system $(\rho, \vartheta, \varphi)$ can be conveniently used, whose origin is located at the transmitting antenna of the radar transmitter installed in said surveillance area/cell.

The procedure for performing the data selection step (block 21 in FIG. 3 and block 41 in FIG. 6) is conveniently different depending on whether the radar transmitter operates only in transmission, or in both transmission and reception.

In fact, if the radar transmitter operates in both transmission and reception (e.g., if the pulse radar technology is used), the distance $\rho$ between each target and the transmitting antenna is known and this element allows performing the search for the proper groups of ellipsoids of revolution by selecting one or more search horizontal planes defined by the distance $\rho$ and one or more elevation angles $\vartheta$, and by changing the azimuthal angle $\varphi$ on the search horizontal plane(s).

Instead, if the radar transmitter operates only in transmission (e.g., if the CW radar technology is used), $\rho$ is varied by small amounts $\Delta\rho$ to search for associated azimuthal angles $\varphi$ (or, equivalently, $\varphi$ is varied by small amounts $\Delta\varphi$ to look for associated distances $\rho$), as it will be explained in greater detail hereinafter.

If, during the search, the number of ellipsoids of revolution within a considered search step $\Delta\rho$ (or $\Delta\varphi$) is greater than the number N of radar receivers installed in the surveillance area/cell, this can be due to either the presence of a plurality of targets within said search step $\Delta\rho$ (or $\Delta\varphi$), or multipath phenomenon. In both cases, this ambiguity can be conveniently solved by a local search based on a smaller $\Delta\rho$ (or $\Delta\varphi$).

If a target is already tracked, a current position thereof can be conveniently predicted based on the last computed position thereof and the associated velocity vector, whereby the search for the respective proper group of ellipsoids of revolution associated with said target is conveniently limited to a (small) neighborhood of the predicted current position (typically, the search is limited to a single point, namely said predicted current position).

Additionally, if in the surveillance area/cell there are targets whose position is known (e.g., if there are cooperative UAVs), said targets can be conveniently excluded from the search.

Therefore, once the groups of ellipsoids of revolution associated with "known" targets (i.e., targets that are already tracked and/or targets whose position is already known) have been identified, a full search procedure can be conveniently carried out only for the remaining ellipsoids of revolution (as described hereinafter) which are associated with one or more targets detected for the first time (e.g., targets that have just entered the surveillance area/cell).

Figure 8:
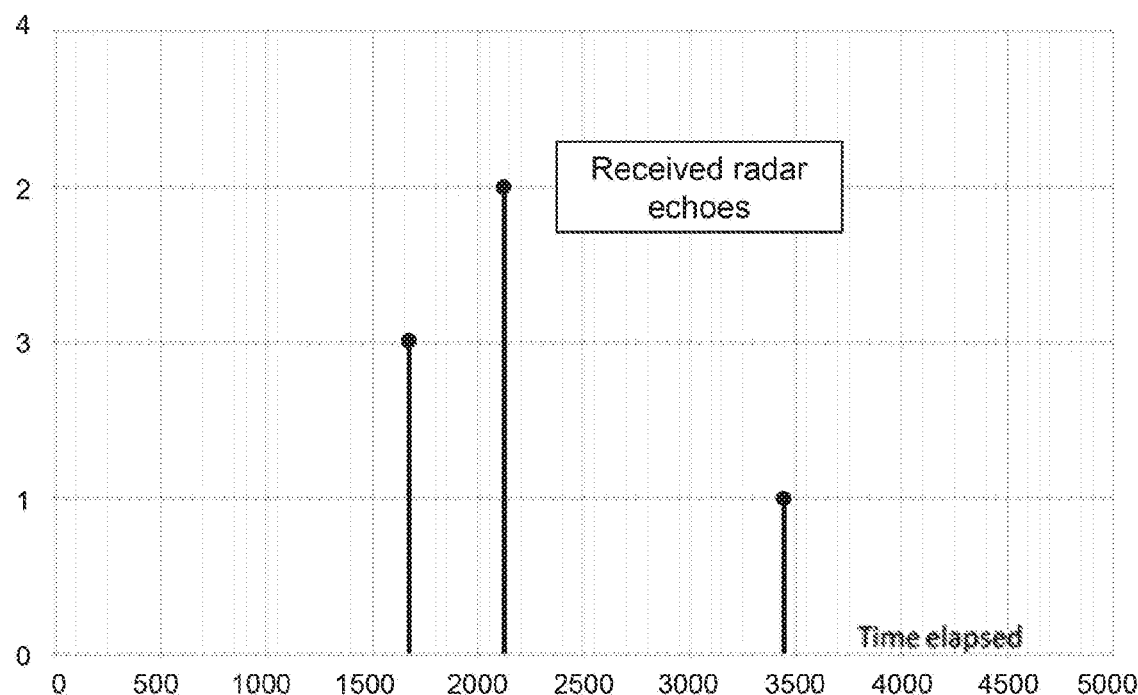
FIG. 8 shows an example of three radar pulse echoes received by a radar receiver of the multistatic radar system of FIG. 1 or the cellular radar system of FIG. 4.

In this connection, FIG. 8 shows an example of three radar echoes (in particular, three radar pulse echoes) received by one and the same radar receiver, wherein each of said three radar echoes can represent a respective target present in the surveillance area/cell.

As previously explained, each radar echo allows computing a respective transmission-reception time delay and, hence, a respective overall distance from the transmitting antenna to the respective target and from said respective target to the receiving antenna, which respective overall distance defines (along with the positions of the transmitting and receiving antennas) a corresponding ellipsoid of revolution.

Figure 9:
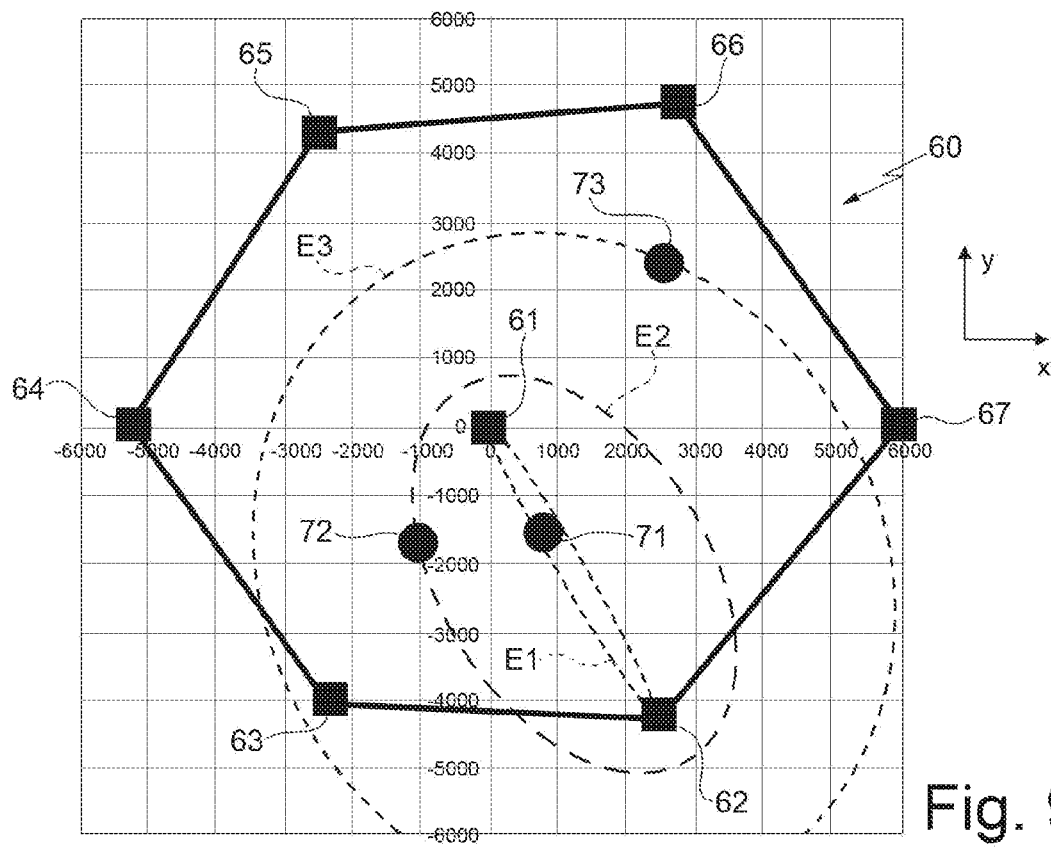
FIG. 9 schematically illustrates a second non-limiting example of operating scenario of a radar transmitter and several radar receivers of the multistatic radar system of FIG. 1 or the cellular radar system of FIG. 4.

In this respect, FIG. 9 schematically shows an example of three ellipses E1, E2, E3 whose rotation about the respective major axis generates the three ellipsoids of revolution (not shown in FIG. 9) associated with the three radar echoes shown in FIG. 8.

In particular, FIG. 9 shows a hexagonal surveillance area/cell 60, wherein a radar transmitter 61 is located approximately at a center of said hexagonal surveillance area/cell 60, whereas six radar receivers (more specifically, a first radar receiver 62, a second radar receiver 63, a third radar receiver 64, a fourth radar receiver 65, a fifth radar receiver 66 and a sixth radar receiver 67) are arranged around the radar transmitter 61 and define a hexagonal perimeter of said hexagonal surveillance area/cell 60.

Additionally, FIG. 9 shows also three targets 71, 72 and 73 that have generated the three radar echoes shown in FIG. 8 and, hence, are located along the ellipses E1, E2, E3, respectively (wherein it is assumed that said three radar echoes have been received by the first radar receiver 62).

In order to search for the proper groups of ellipsoids of revolution related to the different radar receivers in one and the same surveillance area/cell and associated with the different targets present in said surveillance area/cell, a search horizontal plane is conveniently selected. The sensitivity of this selection is not very strong, considering that UAVs fly below 150 m, but this aspect is not critical. In fact, once a first search has been performed, a better search horizontal plane can be conveniently selected, if necessary.

On the selected search horizontal plane, the search is performed moving along the sections defined by said search plane and the ellipsoids of revolution as described hereinafter.

For the selected ellipsoid $k_i$ associated with the $k^{th}$ target and related to the $i^{th}$ radar receiver, it is possible to define a minimum and a maximum search interval:

$$\rho_{kimin} = \frac{R_{ki} - s_{ki}}{2} \quad (5)$$

$$\rho_{kimax} = \frac{R_{ki} + s_{ki}}{2} \quad (6)$$

where
$R_{ki}$ denotes the overall distance from the transmitting antenna to the $k^{th}$ target and from said $k^{th}$ target to the receiving antenna of the $i^{th}$ radar receiver, and
Ski denotes the distance between the receiving antenna of the $i^{th}$ radar receiver and the transmitting antenna.

Varying $\rho$ with a step $\Delta\rho$, it is possible to find the values of the azimuthal angle $\varphi$ associated with the intersections of the ellipsoids of revolution and the considered search horizontal plane. The values of $\varphi$ with the minimum errors determine the ellipsoid groups in a very limited number of steps.

As previously explained, alternatively, the azimuthal angle $\varphi$ can be varied with a step $\Delta\varphi$ to find the values of $\rho$.

More in detail, for a distance $\rho_T = \rho + \Delta\rho$ and a height $\pm h_n$ of the search horizontal plane with respect to the horizontal plane containing the transmitting antenna (i.e., the common focus related to the radar transmitter), it is possible to define an angle $\vartheta_n$ defined as $$\cos(\vartheta_n) = \frac{h_n}{\rho_T},$$

whereby $$\vartheta_n = \begin{cases} \cos^{-1}\left(\frac{h_n}{\rho_T}\right) & \text{for} + h_n \\ \cos^{-1}\left(\frac{h_n}{\rho_T}\right) + \frac{\pi}{2} & \text{for} - h_n \end{cases}$$

Therefore, it is possible to compute, for all the ellipsoids for which $\rho_\tau$ is compatible with the allowed interval [$\rho_{kimin}$, $\rho_{kimax}$], the angular values for an ellipsoid with $i^{th}$ focus and related to the $k^{th}$ target as:

$$\phi_{ki} = \phi_i \pm \arccos\left(\frac{2R_{ki}\rho_T + s_{ki}^2 - R_{ki}^2 + 2s_{ki}\rho_T\cos(\theta_n)\cos(\theta_{ki})}{2s_{ki}\rho_T\sin(\theta_n)\sin(\theta_{ki})}\right) \quad (7)$$

Based on the values $\rho_T$ and $\phi_{ki}$, it is possible to build a table of couples of coordinates and their approximate distance to the point assumed for the target $\rho_T$, $\phi_{ki}$.

Selecting the minimum-distance ones, it is possible to check the congruity of the ellipsoids with the target group. The search is conveniently completed when the number of ellipsoids forming the group is equal the number of the radar receivers.

The above search procedure is performed based on a step variation of $\rho_T$. Therefore, in computational terms, for each position, a limited number of points are computed. This allows making the computational effort linear with the number of targets and ellipsoids.

Said search procedure is much faster than a conventional brute-force search technique that checks congruity by searching for intersection points in a volume search.

In particular, for the previously described search procedure, the calculation operation number is given by:

$$\mathbb{C}_o = 2K_T N U_S$$

where $K_T$ denotes the number of the targets, N denotes the number of the radar receivers, and $U_S$ denotes the number of steps.

Therefore, assuming an average search step of 30 m and a surveillance area/cell size of 5 km radius, the number of steps is lower than 170 (typically 10), being a UAV detected as soon as it enters the surveillance area/cell.

Instead, for a conventional search technique, the calculation operation number is given by:

$$\mathbb{C}_{Conventional} = K_T N U_S \frac{\text{Cell Area}}{\text{initial cell size}^2}$$

Assuming a size (i.e., an area) of 78 km², an initial/average search step of 30 m, $K_T$=30, N=6 and $U_S$ equal to 10 for $\mathbb{C}_o$ and 4 for $\mathbb{C}_{Conventional}$, the result is $\mathbb{C}_o$=6000 and $\mathbb{C}_{Conventional}$=6,200,000. Therefore, with the previously described search procedure there is an advantage of at least three orders of magnitude in the computation complexity. The main reason for such an advantage is the use of a search strategy based on an arbitrary ellipsoid section perimeter instead of the whole surveillance area/cell size area (i.e., linear search against square search).

An additional advantage of the previously described search strategy is the detection of multipath and its elimination. In fact, once a group of ellipsoids has been identified, there is a number of ellipses with the minimum angular errors corresponding to the ellipsoids associated with the relevant radar receivers (i.e., one point for each ellipsoid associated with the radar receiver and then the others).

Figure 10:
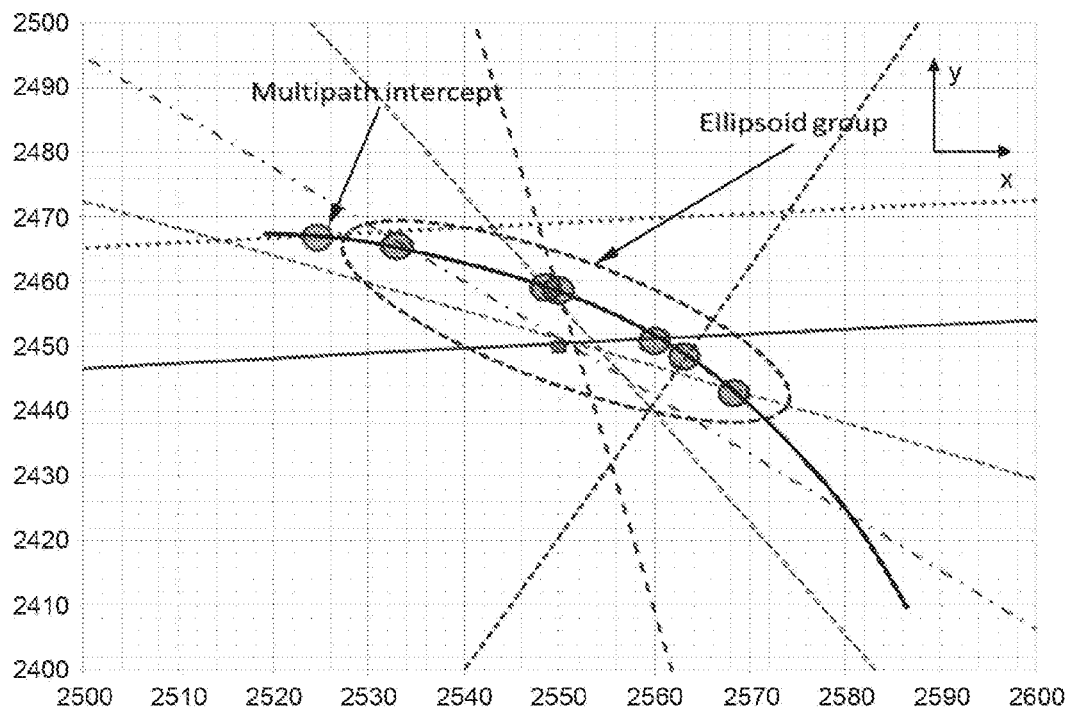
FIG. 10 shows a non-limiting example of multipath detection and elimination performed by the multistatic radar system of FIG. 1 or the cellular radar system of FIG. 4.

The multipath signal defines an additional ellipsoid that is not associated with a radar receiver, but it is assumed as it were; consequently, the angular error is larger than the ones associated with the other ellipsoids (in this respect, reference can be conveniently made to FIG. 10 that shows an example of multipath detection and elimination).

Thence, the multipath signal is identified and not taken into account in the ellipsoid group and, then, in the following target position and velocity computation steps (blocks 22 and 23 in FIG. 3, and blocks 42 and 43 in FIG. 6).

The detection of the signals at the selected radar receiver (wherein the choice of the radar receiver is largely arbitrary) allow determining the number of new targets and, hence, performing an accurate search for the ellipsoid groups. Once the ellipsoid groups have been determined/identified, it is possible to accurately compute 3D positions and, then, 3D velocities of the targets, as previously described, wherein the target velocity computation (block 23 in FIG. 3 and block 43 in FIG. 6) is performed based on measured Doppler frequency observables and on the knowledge of the 3D positions of the targets and, hence, of the vectors between the targets and the transmitting antenna of the radar transmitter and the receiving antennas of the radar receivers.

Again as previously described, the 3D positions and velocities can be conveniently inputted into a Kalman filter to improve position and velocity estimation and to extrapolate the next targets' positions, thereby simplifying the search effort.

4. USE OF FMCW RADAR TECHNOLOGY

The Frequency-Modulated Continuous-Wave (FMCW) radar technology is preferably used for three main reasons: the reduced cost of the transmitter, the strong reduction of the risk of interfering with cellular network signals (without substantially increasing field intensity level around cell towers of mobile phone cellular networks) and, last but not least, the possibility of determining both position and speed of the targets.

The multistatic FMCW radar is a peculiar type of radar transmitting a continuous modulated signal similarly to a conventional FMCW radar that uses a frequency variation function during a predefined time period and can determine two observables of the target: its distance from the radar and its Doppler velocity component along the path connecting the target to the radar itself.

In general, the most popular frequency function used for FMCW is a linear frequency variation during the time period called chirp, so that it is possible to measure the ramp phase variation in the period associated with the target distance and the Doppler shift comparing the frequency variation between transmitted and received ramps.

The main characteristics of the FMCW radar are:
the duration T of the time period for the modulated signal repetition, which shall be larger than the radar range,
the frequency function of the modulating signal, and
the signal bandwidth.

From the comparison between the transmitted signal (or its synchronized copy) and the received signal, it is possible to determine the target observables.

In the context of the present invention, the space information available from the different ellipsoids conveniently allow determining the position and the absolute velocity vectors associated with each target.

Preferably, the used chirp has a peculiar waveform that is not based on a simple frequency ramp, but on a set of ramps that allows forming a respective code associated with each radar transmitter.

Figure 11:
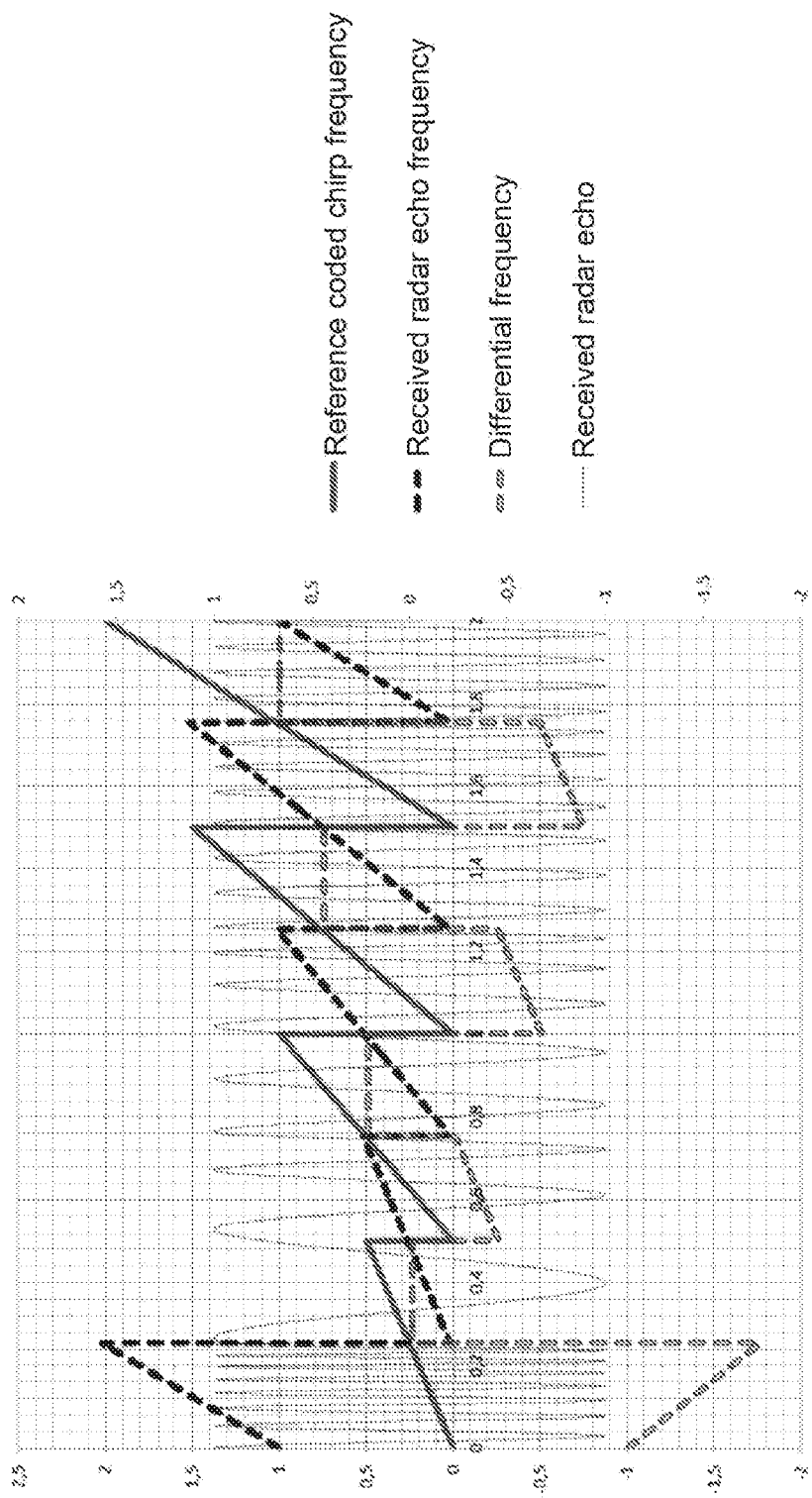
FIG. 11 shows a non-limiting example of coded FMCW radar chirp usable by the multistatic radar system of FIG. 1 or the cellular radar system of FIG. 4.

In this respect, FIG. 11 shows an example of coded FMCW radar chirp along with a corresponding radar echo received from a target and affected by Doppler effect.

In this way, it is possible to associate the delayed radar echoes received at the radar receivers with the proper radar transmitter. In particular, a correlation can conveniently identify the frequency ramp code used in transmission and, hence, the relevant radar transmitter.

For example, a ramp code of four sub-ramps with different frequency heights might be conveniently used. The combination of these sub-ramps would allow generating up to 24 different codes and, hence, separate radar echoes in adjacent cells.

In this way, the range of a multistatic radar cell can be highly independent of the cell size, using the code as a discriminant and the same cell structure for all the cells, thereby simplifying the overall system architecture. The bandwidth associated with the frequency ramp can be conveniently of the order of 20 MHz with a resolution capability of about 1 m.

Figure 12:
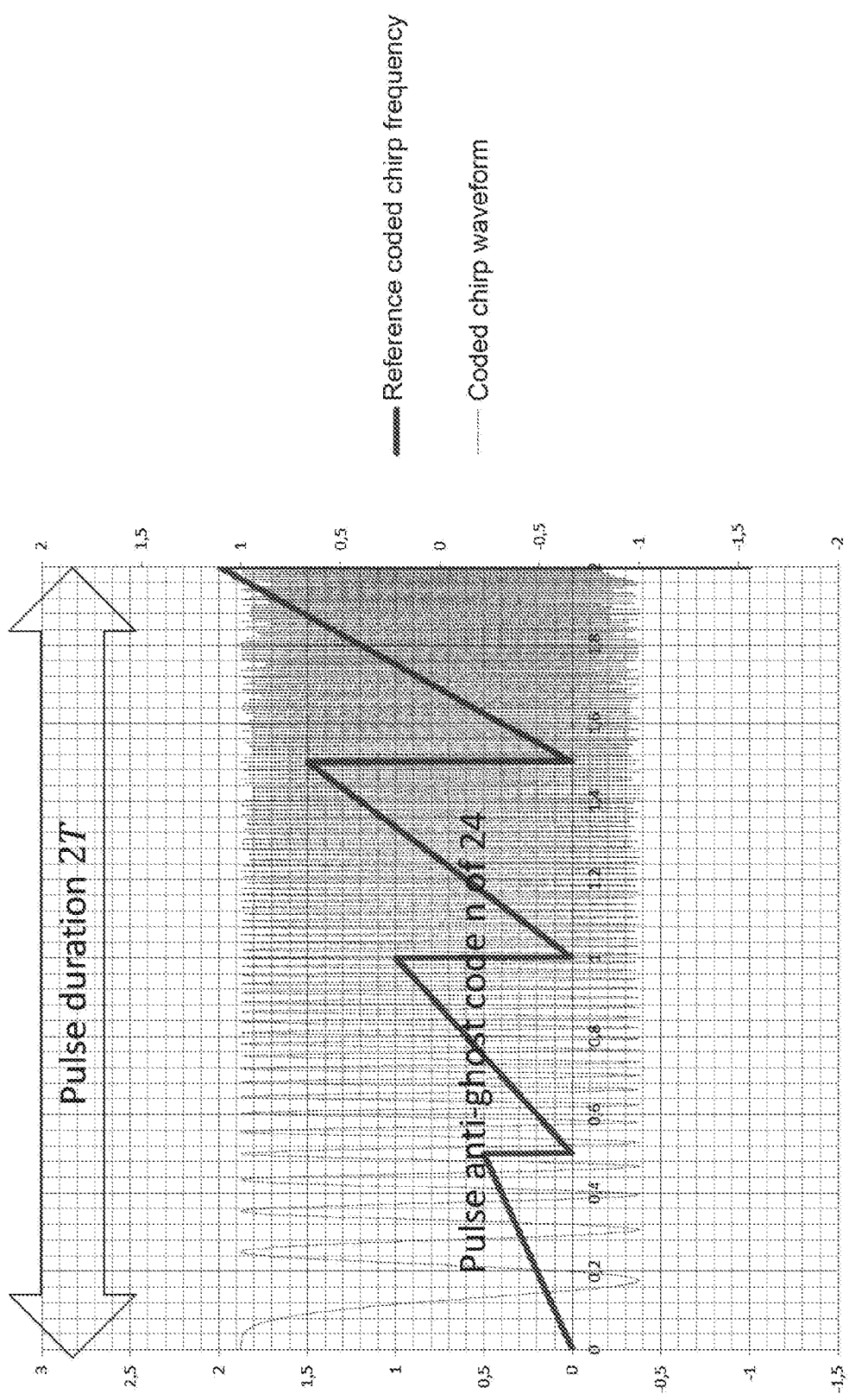
FIGS. 12 and 13 show a non-limiting example of use of differently-coded frequency ramps to generate non-interfering modulated radar signals in adjacent cells of the the cellular radar system of FIG. 4.
Figure 13:
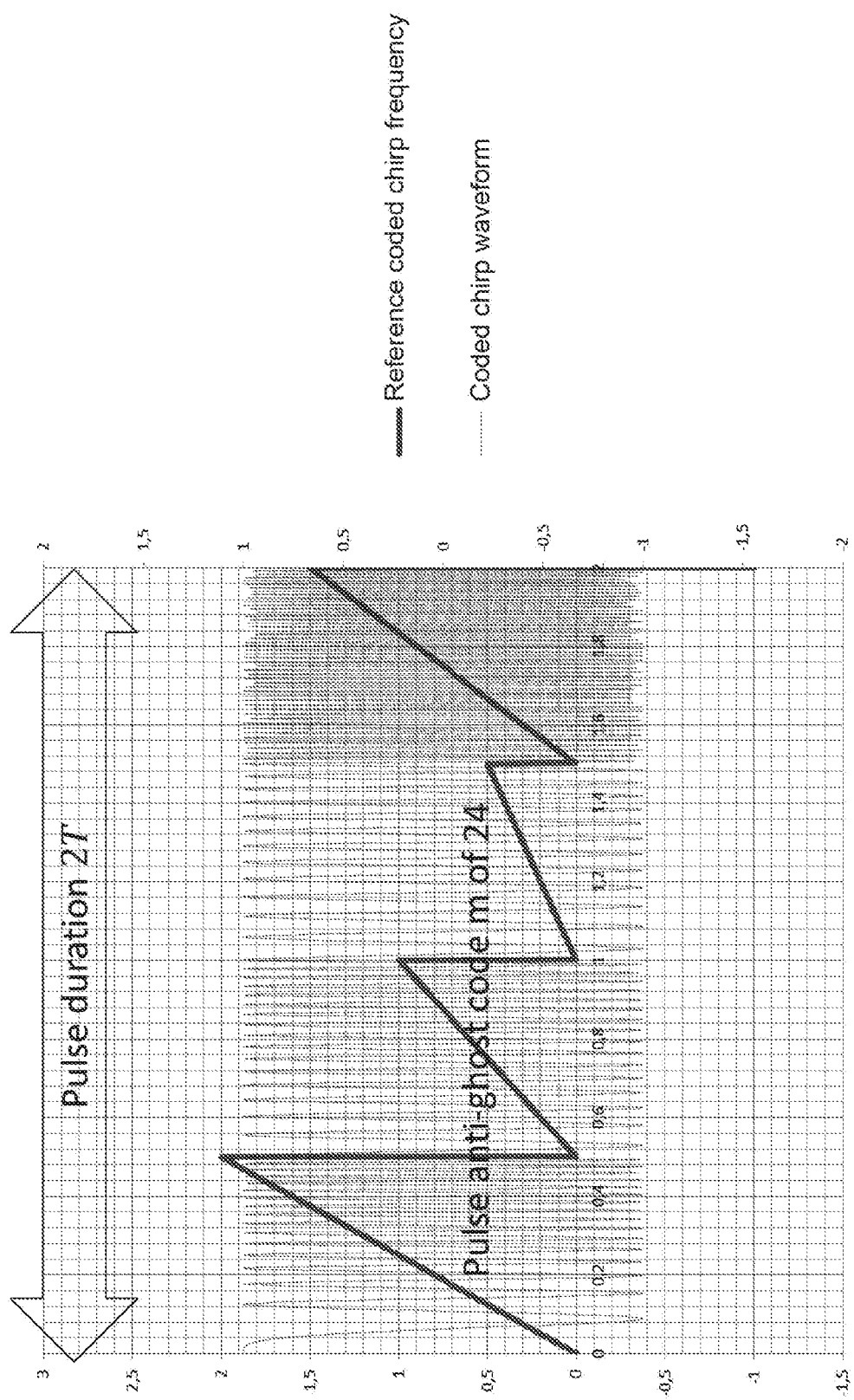

FIGS. 12 and 13 show an example of use of differently-coded frequency ramps to generate non-interfering modulation codes and, hence, non-interfering modulated radar signals.

Therefore, the frequency ramp code can be conveniently used as identity signature of a cell and can be reused in different cells (for example, as illustrated in the example shown in FIG. 5, wherein four different predefined transmission time and frequency patterns (i.e., four frequency ramp codes) are used for different cells of the surveillance region 32).

5. USE OF PULSE RADAR TECHNOLOGY

The use of the FMCW radar technology entails that the radar transmitter cannot operate in reception, unless it is equipped with two co-located and electromagnetically insulated antennas, one operable in transmission and the other operable in reception.

Instead, if the pulse radar technology is used, the radar transmitter can be conveniently equipped with a single antenna operating in both transmission and reception (at different times).

Additionally, the use of pulse radar technology provides the computational advantage that the distance of the targets from the radar transmitter is an observable and not an unknown. As previously explained, this feature simplifies the data selection step and the target position computation step (blocks 21 and 22 in FIG. 3, and blocks 41 and 42 in FIG. 6).

However, it is worth noting that the FMCW radar technology provides additional advantages (in particular, if the radar transmitter and the radar receivers are installed on/at cell towers of one or more mobile phone cellular networks), namely:
- possibility of operating at constant power, with a minimum impact on the mobile phone system;
- the cost of a transmitting and receiving device is larger than an only-transmitting device, while the supplementary processing operations can be easily handled and performed;
- the detection process, conveniently based on ellipsoid group identification, is optimized to minimize the computational requirements thereby rendering marginal the supplementary computational effort necessary for a full multistatic radar system, gathering all the advantages at system level (such as a simplification of network element characteristics, a reduced peak power, the possibility of changing network configuration according to the mission requirements).

6. REMARKS CONCERNING RADAR TRANSMITTERS AND RECEIVERS

Conveniently, the multistatic and cellular radar systems according to the present invention can be based on simple and low-cost components.

For example, in consideration of the short distances involved, the characteristic of bistatic radars to decrease required power of at least 10 dB and the large number of reception points (i.e., radar receivers), the used antennas can be very small and with no need for either mechanical rotation or electronic scanning/aiming.

In fact, the used antennas might conveniently have an omnidirectional horizontal pattern covering a hemispace with a gain of the order of 2-3 dBi.

The required power needs are reasonably low:
- as for the radar transmitter, a radiated power of the order of 5-10 W, and 50 W for the overall required power (including the GNSS receiver and the IP connection);
- as for the radar receivers, an overall required power of 10 W (including the GNSS receiver and the IP connection).

The electromagnetic field density increase due to the radar system is negligible, thanks to the low radiated power and the small number of radar transmitters (6-10 times less than the total number of radar transmitters and receivers, which implies the freedom to select the transmitting antennas in the best positions to minimises the overall power density levels).

In addition to the antenna, the radar transmitters and receivers can conveniently include:
- an FPGA including signal processor and local microprocessor;
- a data memory;
- GNSS-based clock and frequency generation means;
- a Digital-to-Analog Converter (DAC) for the radar transmitters, or an Analog-to-Digital converter (ADC) for the radar receivers;
- frequency upshift means (e.g., from baseband (BB) to radiofrequency (RF), or from BB to Intermediate Frequency (IF) and then from IF to RF, conveniently along with an IF board) for the radar transmitters, or frequency downshift means (e.g., from RF to BB, or from RF to IF and then from IF to BB, conveniently along with an IF board) for the radar receivers; and
- a high power amplifier (HPA) for the radar transmitters, or a low noise amplifier (LNA) for the radar receivers.

The radar transmitters and receivers might conveniently operate at around 8 GHz, but no particular problem is envisaged at different operating frequencies.

The antenna system is not critical for the multistatic and cellular radar systems according to the present invention. As an example, for a typical cell size, a small-size antenna with diameter of 10 cm operating in X band could be conveniently used, with one and the same pattern for radar transmitters and receivers (e.g., an azimuthal omnidirectional pattern and a moderately-shaped pattern in elevation) to optimise gain performance with one radar transmitter and six radar receivers per cell and with hexagonally-shaped cells.

The transmitting antenna(s) might conveniently operate with one circular polarization, while the receiving antennas might conveniently operate with two orthogonal circular polarizations to maximise target RCS.

7. CLOSING REMARKS

From the foregoing, the innovative features and the technical advantages of the present invention are immediately evident to those skilled in art.

In particular, it is worth noting that the use of the multistatic radar system (with the above innovative processing/computation algorithms) according to the present invention is very innovative with wide potentialities for various applications in a few sectors for detecting, tracking and monitoring non-cooperative targets.

Said multistatic radar system is a 3D distributed radar system capable of determining the absolute position and velocity of the detected targets.

System performance is extremely interesting, since it is tailored to control needs and is based on very simple elementary radiofrequency sensors, which have the possibility of guaranteeing low-cost hot redundancy and graceful degradation characteristics even in a minimum operating configuration.

When used over the territory, the system according to the present invention has a very limited impact on the existing infrastructures, thanks to its own characteristics based on multistatic radar architecture and, preferably, a related peculiar form of the used signals.

It is important to note that the present invention takes advantage of available infrastructures, in particular the GNSS infrastructure, which allows common time reference distribution to all the system elements and, hence, the generation of one and the same frequency reference at the radar transmitters and receivers.

Additionally, thanks to the common time reference availability based on the use of GNSS, the present invention is advantageously exploitable in both fixed and mobile scenarios.

As previously explained, the multistatic radar system and the cellular radar system according to the present invention can conveniently exploit pulse radar technology or Continuous Wave (CW) radar technology, preferably using Frequency-Modulated (FM) chirps (or spread spectrum (CDMA) schemes as well).

In particular, in order to simplify hardware elements and minimize peak power, FMCW can be conveniently used with properly coded chirps (preferably optimized for non-cooperative UAV detection and tracking).

Additionally, the radar transmitters and receivers can be conveniently installed at/on cell towers of one or more mobile phone cellular networks. In this respect, it is worth noting that exploitation of the mobile phone cellular network infrastructure can be extremely advantageous. In fact, the cellular radar system may conveniently use cells corresponding to cell towers of mobile phone cellular networks with a limited number of additional infrastructures for conveniently matching coverage requirements. The cell towers may conveniently supply radar transmitters and receivers with all ancillary and logistic services, such as electrical power, installation authorization, maintenance and infrastructure management. Additionally, the positions of the radar transmitters and receivers can be determined by using a high-accuracy georeferenced system, for example supported by Building Information Modeling (BIM) information files, wherein these data are largely available at infrastructure owner premises. Conveniently, the multistatic radar components are small and low power consuming, the most of them are only-receiving devices, while the transmitting ones radiate a power lower than 5 W, so that the impact on the existing mobile phone cellular networks is negligible. Additionally, the transmission of the data to one or more processing points can be conveniently based on the use of one or more mobile phone cellular networks (such as that/those one(s) based on 5G) thereby having low latency. Anyway, the use of temporal marks associated with the transmitted data and based on a common GNSS-based time reference allows avoiding synchronization of the data network.

The radar system elements may conveniently communicate with a hierarchy of control centers including, for example, a first control center co-located with the relevant radar transmitter, then there can be a regional/national control center for managing inter-cell target handover between/among different cells and for integration of the data/information items related to non-cooperative UAVs with those ones related to cooperative UAVs. In fact, a combined use of systems for detecting and tacking cooperative and non-operative UAVs enables a complete monitoring of all kinds of UAVs in a unified non-segregated airspace, with the possibility of identifying and contrasting unauthorized UAV flights.

The system synchronization is guaranteed by the use of time information derived from the high-accuracy GNSS signals available at the radar transmitters and receivers, whereby the entire radar network is synchronous without any additional effort than the use of GNSS receivers (e.g., preferably based on both Galileo and GPS technologies), whereby GNSS represents a powerful enabling technology of the present invention, allowing a low-cost high-accuracy time and frequency synchronization of the system.

It is important to highlight the fact that the present invention allows computing three-dimensional (absolute) positions and velocities of the detected targets. Moreover, Kalman filter may conveniently operate very effectively to limit false alarms (e.g., due to non-real UAVs, such as birds or ground reflections) and to support target position estimation during tracking and monitoring phase.

Therefore, the multistatic radar system according to the present invention operates as a distributed 3D radar, with two main advantages, namely: the simplicity of the radar components with respect to the heavy and costly conventional 3D radar components, and the additional performance of providing not only the velocity Doppler component, but the whole velocity vector.

Additionally, the system may conveniently extend, via software, cell size or use more cells to identify one and the same target.

More in general, the present invention provides a very powerful and effective tool for detecting, tracking and monitoring moving targets such as non-cooperative UAVs. Conveniently, the used antennas can be small and simple with an azimuthal omnidirectional pattern. The possibility of using an adequate number of radar receivers allows determining all targets' position and velocity components, conveniently using chirp modulated signals.

Additionally, the system is naturally redundant and in case of malfunctioning of one radar receiver/transmitter, the system can conveniently operate in a graceful degradation mode. In fact, in case of a radar receiver failure, the system can conveniently define a new cell geometry, while for the case of a radar transmitter failure, two cells can be unified and operations can continue without interruption.

Additional redundancy configurations can be conveniently organized according to an operational software procedure, such as the possibility of operating with two (or more) radar transmitters in one and the same region using different dedicated chirp sequences as previously described.

The geometrical definition of a cell is somewhat arbitrary and can include either targets inside the perimeter defined by the radar receivers, or can include external areas as well.

The possibility of obtaining six motion components (i.e., three position components and three velocity components) has many advantages, such as a much better Kalman filter optimization with respect to the one based only on positions, improving the capability to limit false alarms and to predict targets' future positions with enhanced accuracy.

Additionally, the knowledge of the six motion components, once the target has been detected for the first time, allows dramatically simplifying target tacking and therefore reducing power necessary for real-time processing for continuous target monitoring.

An important aspect of the present invention, as previously explained, is the use of an absolute common GNSS-based time reference for the entire system.

In fact, the use of such a common GNSS-based time reference avoids the transmission of a temporal reference to all the elements of the system (i.e., radar transmitters and receivers) and makes the system, on the one hand, simpler and, on the other hand, safer. As previously described, the transmitter-target-receiver distance computation is based on a sort of pseudorange computation, namely on the time difference between radar signal transmission and corresponding radar echo reception, with the advantage that all the elements of the system (i.e., radar transmitters and receivers) are synchronized based on said common GNSS-based time reference.

Additionally, thanks to the use of said common GNSS-based time reference, on the one hand, the time error among the radar transmitters and receivers is extremely low, being their coordinates known with very high accuracy and residual errors on time being compensated by a common shift (in fact, all the radar transmitters and receivers are likely to use one and the same GNSS satellite set, or at least a large part of the GNSS satellites are the same for all the radar transmitter and receivers belonging to one and the same cell). On the other hand, the use of the common GNSS-based time reference allows minimizing the cost of keeping the radar system synchronism.

As previously explained, the multistatic radar system and the cellular radar system according to the present invention can be advantageously exploited for many applications in both fixed and mobile operating scenarios.

Additionally, the multistatic radar system or each cell of the cellular radar system according to the present invention can be conveniently provided with its own surveillance UAV fleet for identification and physical tracking purposes to minimize flight time to reach detected/tracked targets.

In extreme synthesis, the present invention provides a distributed 3D radar that has many advantages with respect to conventional 3D radar systems, namely:
simplicity and low cost of the used radar components;
intrinsic redundancy and graceful degradation behavior;
coverage flexibility and adaptability;
highly flexible and scalable architecture;
absolute 3D position and velocity estimation; and
capability to identify and eliminate multipath contribution.

In conclusion, it is clear that numerous modifications and variants can be made to the present invention, all falling within the scope of the invention, as defined in the appended claims.

The invention claimed is:

1. Multistatic radar system (10) for detecting and tracking a plurality of targets (50, 71, 72, 73) moving in a surveillance area (16, 60); said multistatic radar system (10) comprising:
a radar transmitter (11, 61) and a plurality of radar receivers (12, 62, 63, 64, 65, 66, 67) located in different positions in said surveillance area (16, 60); and
processing means (13);
wherein the radar transmitter (11, 61) and the radar receivers (12, 62, 63, 64, 65, 66, 67) include, each, a respective global navigation satellite system receiver (15) configured to receive GNSS signals from one or global navigation satellite systems;
wherein said radar transmitter (11, 61) and said radar receivers (12, 62, 63, 64, 65, 66, 67) are configured to obtain a GNSS-based time reference based on the GNSS signals received by the respective global navigation satellite system receiver (15), wherein said GNSS-based time reference is common to said radar transmitter (11, 61) and said radar receivers (12, 62, 63, 64, 65, 66, 67);
wherein the radar transmitter (11, 61) is configured to transmit, by means of a transmitting antenna (111), radar signals according to a predefined transmission time and frequency pattern and on the basis of the GNSS-based time reference;
wherein the radar receivers (12, 62, 63, 64, 65, 66, 67) are configured to receive, each by means of a respective receiving antenna (121), radar echoes from one or more of the plurality of targets (50, 71, 72, 73) moving in the surveillance area (16, 60) and illuminated by the radar signals transmitted by the radar transmitter (11, 61);
wherein each radar receiver (12, 62, 63, 64, 65, 66, 67) is configured to:
determine, for each radar echo received by said radar receiver (12, 62, 63, 64, 65, 66, 67) from a respective target included in the plurality of targets (50, 71, 72, 73),
a corresponding receiver distance-related information item based on the predefined transmission time and frequency pattern, the GNSS-based time reference and a respective reception time of said radar echo, wherein said corresponding receiver distance-related information item is related to an overall length of a respective path from the transmitting antenna (111) to the respective target (50, 71, 72, 73) and from said respective target (50, 71, 72, 73) to the respective receiving antenna (121) of said radar receiver (12, 62, 63, 64, 65, 66, 67), and
a corresponding Doppler frequency of said radar echo based on the predefined transmission time and frequency pattern and the GNSS-based time reference; and
provide the processing means (13) with
data indicative of the receiver distance-related information items and the Doppler frequencies determined by said radar receiver (12, 62, 63, 64, 65, 66, 67), and
reference times associated with said receiver distance-related information items and said Doppler frequencies, wherein said reference times are referenced to the GNSS-based time reference;
wherein the processing means (13) are configured to perform:
a data selection step including selecting receiver distance-related information items and Doppler frequencies that have been provided by different radar receivers (12, 62, 63, 64, 65, 66, 67),
are temporally-corresponding to each other, and
relate to one and the same respective target (50, 71, 72, 73);
a target position computation step including computing a three-dimensional position of said one and the same respective target (50, 71, 72, 73) based on
the selected receiver distance-related information items,
a position of the transmitting antenna (111), and
positions of, and distances from the transmitting antenna (111) of, the receiving antennas (121) of the radar receivers (12, 62, 63, 64, 65, 66, 67) that have provided said selected receiver distance-related information items; and
a target velocity computation step including computing a three-dimensional velocity of said one and the same respective target (50, 71, 72, 73) based on the computed three-dimensional position thereof and the selected Doppler frequencies;

wherein the data selection step performed by the processing means (13) includes:

selecting, among the receiver distance-related information items provided by the radar receivers (12, 62, 63, 64, 65, 66, 67), receiver distance-related information items that have been provided by different radar receivers (12, 62, 63, 64, 65, 66, 67) and that are temporally-corresponding to each other; and defining temporally-corresponding ellipsoids of revolution based on the selected receiver distance-related information items, wherein each of said temporally-corresponding ellipsoids of revolution is associated with a respective radar receiver (12, 62, 63, 64, 65, 66, 67) and a respective selected receiver distance-related information item provided by said respective radar receiver (12, 62, 63, 64, 65, 66, 67), and is defined by rotation of a respective ellipse about its major axis, wherein said respective ellipse has the transmitting antenna (111) and the receiving antenna (121) of said respective radar receiver (12, 62, 63, 64, 65, 66, 67) as foci, and is such that, for each point thereof, a sum of two respective distances to the foci is equal to the respective overall length which said respective selected receiver distance-related information item is related to, whereby, for each point on a surface of the resultant ellipsoid of revolution, a sum of two respective distances to the transmitting antenna (111) and the receiving antenna (121) of the respective radar receiver (12, 62, 63, 64, 65, 66, 67) is equal to said respective overall length;

characterized in that the data selection step performed by the processing means (13) further includes selecting, among the temporally-corresponding ellipsoids of revolution, a group thereof related to one and the same respective target (50, 71, 72, 73), by:

using a spherical coordinate system whose origin is located at the transmitting antenna (111), whereby positions are expressed in terms of distance, elevation angle and azimuthal angle with respect to the transmitting antenna (111);

considering one or more search planes defined by one or more elevation angles and one or more distances from the transmitting antenna (111) or azimuthal angles;

finding azimuthal angle values or distance values associated with intersections of the temporally-corresponding ellipsoids of revolution with the considered search plane(s); and selecting a group of temporally-corresponding ellipsoids related to one and the same respective target (50, 71, 72, 73) on the basis of said azimuthal angle values or said distance values;

and wherein the target position computation step performed by the processing means (13) includes computing a three-dimensional position of the one and the same respective target (50, 71, 72, 73) which the selected group of temporally-corresponding ellipsoids is related to, by:

using a Cartesian coordinate system whose origin is located at the transmitting antenna (111);

solving a predefined linear equation system to estimate three coordinates of said one and the same target (50, 71, 72, 73) in said Cartesian coordinate system, wherein said predefined linear equation system relates the three coordinates of said one and the same respective target (50, 71, 72, 73) in said Cartesian coordinate system and a distance of said one and the same respective target (50, 71, 72, 73) from the transmitting antenna (111) to the overall lengths which the receiver distance-related information items associated with the selected group of temporally-corresponding ellipsoids are related to, and the positions of, and the distances from the transmitting antenna (111) of, the receiving antennas (121) of the radar receivers (12, 62, 63, 64, 65, 66, 67) associated with the selected group of temporally-corresponding ellipsoids, wherein the positions of said receiving antennas (121) are expressed, each, in terms of three respective coordinates in said Cartesian coordinate system; and using an additional calculation to improve estimation of a height coordinate of said one and the same respective target (50, 71, 72, 73), wherein said additional calculation relates the distance of said one and the same target (50, 71, 72, 73) from the transmitting antenna (111) and the estimated three coordinates of said one and the same respective target (50, 71, 72, 73) in said Cartesian coordinate system.

2. The multistatic radar system of claim 1, wherein selecting, among the temporally-corresponding ellipsoids of revolution, a group thereof related to one and the same target (50, 71, 72, 73) includes varying the distance from the transmitting antenna (111) or the azimuthal angle to respectively find the azimuthal angle values or the distance values associated with the intersections of the temporally-corresponding ellipsoids of revolution with the considered search plane(s).

3. The multistatic radar system of claim 1, wherein the radar transmitter (11, 61) is further configured to:

receive radar echoes from one or more targets included in the plurality of targets (50, 71, 72, 73) moving in the surveillance area (16, 60) and illuminated by the radar signals transmitted by said radar transmitter (11, 61);

determine, for each radar echo received by said radar transmitter (11, 61) from a respective target included in the plurality of targets (50, 71, 72, 73), a corresponding transmitter distance-related information item based on the predefined transmission time and frequency pattern, the GNSS-based time reference and a respective reception time of said radar echo, wherein said corresponding transmitter distance-related information item is related to a distance of said respective target (50, 71, 72, 73) from the transmitting antenna (111), and a corresponding Doppler frequency of said radar echo based on the predefined transmission time and frequency pattern and the GNSS-based time reference; and provide the processing means (13) with data indicative of the transmitter distance-related information items and the Doppler frequencies determined by said radar transmitter (11, 61), and reference times associated with said transmitter distance-related information items and said Doppler frequencies, wherein said reference times are referenced to the GNSS-based time reference;
wherein the processing means (13) is configured to carry out the data selection step, the target position computation step and the target velocity computation step based on also the transmitter distance-related information items and the Doppler frequencies provided by the radar transmitter (11, 61);
wherein selecting, among the temporally-corresponding ellipsoids of revolution, a group thereof related to one and the same respective target (50, 71, 72, 73) includes:
considering one or more search planes defined by
one or more elevation angles and
one or more given distances from the transmitting antenna (111) based on one or more given transmitter distance-related information items, which is/are
temporally-corresponding to the receiver distance-related information items associated with the temporally-corresponding ellipsoids of revolution, and
related to said given distance(s) from the transmitting antenna (111);
finding azimuthal angle values associated with intersections of the temporally-corresponding ellipsoids of revolution with the considered search plane(s); and
selecting a group of temporally-corresponding ellipsoids related to one and the same target (50, 71, 72, 73) on the basis of said azimuthal angle values;
and wherein, in the target position computation step, the three-dimensional position of the one and the same target (50, 71, 72, 73), which the selected group of temporally-corresponding ellipsoids is related to, is computed by solving the predefined linear equation system and the additional equation by using, in said predefined linear equation system and said additional equation, as distance of said one and the same respective target (50, 71, 72, 73) from the transmitting antenna (111), the distance which the transmitter distance-related information item temporally-corresponding to the selected group of temporally-corresponding ellipsoids is related to.

4. The multistatic radar system of claim 3, wherein the radar transmitter (11, 61) is configured to determine, for each radar echo received by said radar transmitter (11, 61) from a respective target (50, 71, 72, 73), a corresponding transmitter distance-related information item by computing, based on the predefined transmission time and frequency pattern, the GNSS-based time reference and a respective reception time of said radar echo, a respective transmission-reception time delay, wherein said corresponding transmitter distance-related information item is:
said respective transmission-reception time delay, or
the distance of the respective target (50, 71, 72, 73) from the transmitting antenna (111) computed based on said respective transmission-reception time delay.

5. The multistatic radar system according to claim 1, wherein each radar receiver (12, 62, 63, 64, 65, 66, 67) is configured to determine, for each radar echo received by said radar receiver (12, 62, 63, 64, 65, 66, 67) from a respective target (50, 71, 72, 73), a corresponding receiver distance-related information item by computing, based on the predefined transmission time and frequency pattern, the GNSS-based time reference and a respective reception time of said radar echo, a respective transmission-reception time delay, wherein said corresponding receiver distance-related information item is:
said respective transmission-reception time delay; or
the overall length of the respective path from the transmitting antenna (111) to the respective target (50, 71, 72, 73) and from said respective target (50, 71, 72, 73) to the respective receiving antenna (121) of said radar receiver (12, 62, 63, 64, 65, 66, 67) computed based on said respective transmission-reception time delay.

6. The multistatic radar system according to claim 1, wherein the radar transmitter (11, 61) and the radar receivers (12, 62, 63, 64, 65, 66, 67) are installed at fixed positions, and wherein the processing means (13) are configured to:
store
the positions of the transmitting antenna (111) and of the receiving antennas (121), and
the distances of said receiving antennas (121) from said transmitting antenna (111); and
configured to perform the data selection step, the target position computation step and the target velocity computation step based on said stored positions and distances.

7. The multistatic radar system according to claim 1, wherein the radar transmitter (11, 61) and the radar receivers (12, 62, 63, 64, 65, 66, 67) are installed on mobile platforms and are configured to:
obtain their positions, each from the respective global navigation satellite system receiver (15); and
provide the processing means (13) with time-referenced positioning data indicative of their positions temporally referenced to the GNSS-based time reference;
wherein the processing means (13) is configured to:
determine time-referenced distances between the transmitting antenna (111) and the receiving antennas (121) based on the time-referenced positioning data received from the radar transmitter (11, 61) and the radar receivers (12, 62, 63, 64, 65, 66, 67); and
perform the data selection step, the target position computation step and the target velocity computation step based on the determined time-referenced distances between the transmitting antenna (111) and the receiving antennas (121), and the time-referenced positioning data received from the radar transmitter (11, 61) and the radar receivers (12, 62, 63, 64, 65, 66, 67).

8. The multistatic radar system according to claim 1, wherein the processing means (13) is further configured to perform a Kalman filtering step including applying a predefined Kalman filtering to the computed three-dimensional position and velocity of a target (50, 71, 72, 73) detected in the surveillance area (16, 60), thereby obtaining refined three-dimensional position and velocity of said detected target (50, 71, 72, 73).

9. The multistatic radar system of claim 8, wherein the processing means (13) is further configured to perform a target tracking step including tracking the respective target detected in the surveillance area (16, 60) by carrying out the data selection step, the target position computation step, the target velocity computation step and the Kalman filtering step based on temporally successive receiver distance-related information items and Doppler frequencies related to said detected target.

10. The multistatic radar system of claim 9, wherein the processing means (13) is configured to carry out the data selection step, the target position computation step, the target velocity computation step, the Kalman filtering step and the target tracking step for a plurality of targets (50, 71, 72, 73) detected in the surveillance area (16, 60).

11. The multistatic radar system according to claim 9, wherein the processing means (13) is further configured to perform a countermeasure step for one or more first detected/tracked targets (50, 71, 72, 73) whose computed three-dimensional position(s) and/or velocity (ies) meets/meet first predefined alert conditions; wherein said countermeasure step includes generating one or more alerts and/or activating one or more countermeasures against said first detected/tracked target(s) (50, 71, 72, 73).

12. Multistatic radar system (10) for detecting and tracking a plurality of targets (50, 71, 72, 73) moving in a surveillance area (16, 60); said multistatic radar system (10) comprising:
- a radar transmitter (11, 61) and a plurality of radar receivers (12, 62, 63, 64, 65, 66, 67) located in different positions in said surveillance area (16, 60); and
- processing means (13);
- wherein the radar transmitter (11, 61) and the radar receivers (12, 62, 63, 64, 65, 66, 67) include, each, a respective global navigation satellite system receiver (15) configured to receive GNSS signals from one or global navigation satellite systems;
- wherein said radar transmitter (11, 61) and said radar receivers (12, 62, 63, 64, 65, 66, 67) are configured to obtain a GNSS-based time reference based on the GNSS signals received by the respective global navigation satellite system receiver (15), wherein said GNSS-based time reference is common to said radar transmitter (11, 61) and said radar receivers (12, 62, 63, 64, 65, 66, 67);
- wherein the radar transmitter (11, 61) is configured to transmit, by means of a transmitting antenna (111), radar signals according to a predefined transmission time and frequency pattern and on the basis of the GNSS-based time reference;
- wherein the radar receivers (12, 62, 63, 64, 65, 66, 67) are configured to receive, each by means of a respective receiving antenna (121), radar echoes from one or more of the plurality of targets (50, 71, 72, 73) moving in the surveillance area (16, 60) and illuminated by the radar signals transmitted by the radar transmitter (11, 61);
- wherein each radar receiver (12, 62, 63, 64, 65, 66, 67) is configured to:
- determine, for each radar echo received by said radar receiver (12, 62, 63, 64, 65, 66, 67) from a respective target included in the plurality of targets (50, 71, 72, 73),
  - a corresponding receiver distance-related information item based on the predefined transmission time and frequency pattern, the GNSS-based time reference and a respective reception time of said radar echo, wherein said corresponding receiver distance-related information item is related to an overall length of a respective path from the transmitting antenna (111) to the respective target (50, 71, 72, 73) and from said respective target (50, 71, 72, 73) to the respective receiving antenna (121) of said radar receiver (12, 62, 63, 64, 65, 66, 67), and
  - a corresponding Doppler frequency of said radar echo based on the predefined transmission time and frequency pattern and the GNSS-based time reference; and
- provide the processing means (13) with
  - data indicative of the receiver distance-related information items and the Doppler frequencies determined by said radar receiver (12, 62, 63, 64, 65, 66, 67), and
  - reference times associated with said receiver distance-related information items and said Doppler frequencies, wherein said reference times are referenced to the GNSS-based time reference;
- wherein the processing means (13) are configured to perform:
- a data selection step including selecting receiver distance-related information items and Doppler frequencies that have been provided by different radar receivers (12, 62, 63, 64, 65, 66, 67),
  - are temporally-corresponding to each other, and
  - relate to one and the same respective target (50, 71, 72, 73);
- a target position computation step including computing a three-dimensional position of said one and the same respective target (50, 71, 72, 73) based on
  - the selected receiver distance-related information items,
  - a position of the transmitting antenna (111), and
  - positions of, and distances from the transmitting antenna (111) of, the
  - receiving antennas (121) of the radar receivers (12, 62, 63, 64, 65, 66, 67) that
  - have provided said selected receiver distance-related information items; and
- a target velocity computation step including computing a three-dimensional velocity of said one and the same respective target (50, 71, 72, 73) based on the computed three-dimensional position thereof and the selected Doppler frequencies;
- wherein the data selection step performed by the processing means (13) includes:
- selecting, among the receiver distance-related information items provided by the radar receivers (12, 62, 63, 64, 65, 66, 67), receiver distance-related information items that have been provided by different radar receivers (12, 62, 63, 64, 65, 66, 67) and that are temporally-corresponding to each other; and
- defining temporally-corresponding ellipsoids of revolution based on the selected receiver distance-related information items, wherein each of said temporally-corresponding ellipsoids of revolution
  - is associated with a respective radar receiver (12, 62, 63, 64, 65, 66, 67) and a respective selected receiver distance-related information item provided by said respective radar receiver (12, 62, 63, 64, 65, 66, 67), and
  - is defined by rotation of a respective ellipse about its major axis, wherein said respective ellipse
    - has the transmitting antenna (111) and the receiving antenna (121) of said respective radar receiver (12, 62, 63, 64, 65, 66, 67) as foci, and is such that, for each point thereof, a sum of two respective distances to the foci is equal to the respective overall length which said respective selected receiver distance-related information item is related to, whereby, for each point on a surface of the resultant ellipsoid of revolution, a sum of two respective distances to the transmitting antenna (111) and the receiving antenna (121) of the respective radar receiver (12, 62, 63, 64, 65, 66, 67) is equal to said respective overall length;
- characterized in that the data selection step performed by the processing means (13) further includes selecting, among the temporally-corresponding ellipsoids of revolution, a group thereof related to one and the same respective target (50, 71, 72, 73), by:
- using a spherical coordinate system whose origin is located at the transmitting antenna (111), whereby positions are expressed in terms of distance, elevation angle and azimuthal angle with respect to the transmitting antenna (111);

considering one or more search planes defined by one or more elevation angles and one or more distances from the transmitting antenna (111) or azimuthal angles;

finding azimuthal angle values or distance values associated with intersections of the temporally-corresponding ellipsoids of revolution with the considered search plane(s); and selecting a group of temporally-corresponding ellipsoids related to one and the same respective target (50, 71, 72, 73) on the basis of said azimuthal angle values or said distance values;

and wherein the target position computation step performed by the processing means (13) includes computing a three-dimensional position of the one and the same respective target (50, 71, 72, 73) which the selected group of temporally-corresponding ellipsoids is related to, by:

using a Cartesian coordinate system whose origin is located at the transmitting antenna (111);

solving a predefined linear equation system to estimate three coordinates of said one and the same target (50, 71, 72, 73) in said Cartesian coordinate system, wherein said predefined linear equation system relates the three coordinates of said one and the same respective target (50, 71, 72, 73) in said Cartesian coordinate system and a distance of said one and the same respective target (50, 71, 72, 73) from the transmitting antenna (111) to the overall lengths which the receiver distance-related information items associated with the selected group of temporally-corresponding ellipsoids are related to, and the positions of, and the distances from the transmitting antenna (111) of, the receiving antennas (121) of the radar receivers (12, 62, 63, 64, 65, 66, 67) associated with the selected group of temporally-corresponding ellipsoids, wherein the positions of said receiving antennas (121) are expressed, each, in terms of three respective coordinates in said Cartesian coordinate system; and using an additional calculation to improve estimation of a height coordinate of said one and the same respective target (50, 71, 72, 73), wherein said additional calculation relates the distance of said one and the same target (50, 71, 72, 73) from the transmitting antenna (111) and the estimated three coordinates of said one and the same respective target (50, 71, 72, 73) in said Cartesian coordinate system;

wherein the multistatic radar system (10) further comprises an identification system including a plurality of surveillance unmanned aerial vehicles equipped with video capture devices, and wherein the processing means (13) are further configured to perform a target identification step for one or more second detected/tracked targets (50, 71, 72, 73) whose computed three-dimensional position(s) and/or velocity (ies) meets/meet second predefined alert conditions;

wherein the processing means (13) is further configured to perform a Kalman filtering step including applying a predefined Kalman filtering to the computed three-dimensional position and velocity of a target (50, 71, 72, 73) detected in the surveillance area (16, 60), thereby obtaining refined three-dimensional position and velocity of said detected target (50, 71, 72, 73);

wherein the processing means (13) is further configured to perform a target tracking step including tracking the respective target detected in the surveillance area (16, 60) by carrying out the data selection step, the target position computation step, the target velocity computation step and the Kalman filtering step based on temporally successive receiver distance-related information items and Doppler frequencies related to said detected target;

wherein said target identification step performed by the processing means (13) is based on the computed three-dimensional position(s) and/or velocity (ies) of said second detected/tracked target(s) (50, 71, 72, 73) and includes:

causing one or more of the surveillance unmanned aerial vehicles to take off, reach the second detected/tracked target(s) (50, 71, 72, 73) and capture one or more videos thereof; and carrying out identification and/or classification of said second detected/tracked target(s) (50, 71, 72, 73) based on the captured video(s).

13. The multistatic radar system of claim 12, wherein the processing means (13) is configured to perform also a countermeasure step if a result of the target identification step performed for the second detected/tracked target(s) (50, 71, 72, 73) meets third predefined alert conditions; wherein said countermeasure step includes generating one or more alerts and/or activating one or more countermeasures against said second detected/tracked target(s) (50, 71, 72, 73).

14. The multistatic radar system of claim 13, wherein the second detected/tracked target(s) (50, 71, 72, 73) is/are unmanned aerial vehicle(s), and wherein the countermeasure step includes causing the surveillance unmanned aerial vehicle(s), which have taken off and reached said second detected/tracked target(s) (50, 71, 72, 73) for performing the target identification step, to force said second detected/tracked target(s) (50, 71, 72, 73) to land.

15. The multistatic radar system according to claim 1, wherein the radar transmitter (11, 61) and the radar receivers (12, 61, 62, 63, 64, 65, 66, 67) are configured to operate based on continuous-wave radar technology or pulse radar technology.

16. The multistatic radar system of claim 15, wherein the radar transmitter (11, 61) and the radar receivers (12, 61, 62, 63, 64, 65, 66, 67) are configured to operate based on frequency-modulated continuous-wave radar technology, or frequency-modulated pulse radar technology.

17. The multistatic radar system according to claim 1, wherein the processing means (13) is:

integrated with the radar transmitter (11, 61) into a radar transmitting station (14) and connected, in a wireless and/or wired fashion, to the radar receivers (12, 62, 63, 64, 65, 66, 67); or arranged separately from the radar transmitter (11, 61) and connected, in a wireless and/or wired fashion, to the radar transmitter (11, 61) and to the radar receivers (12, 62, 63, 64, 65, 66, 67).

18. The multistatic radar system according to claim 1, wherein the radar receivers (12, 62, 63, 64, 65, 66, 67) are arranged around the radar transmitter (11, 61) to form a perimeter of the surveillance area (16, 60).

19. The multistatic radar system of claim 18, wherein the radar transmitter (11, 61) is arranged at a center of the surveillance area (16, 60).

20. Cellular radar system (30) for detecting, tracking and monitoring targets (50, 71, 72, 73) moving in a surveillance region (32) divided into cells (16, 60), wherein said cellular radar system (30) includes, for each cell (16, 60), a respective multistatic radar system (10) as claimed in claim 1 that is installed in said cell (16, 60).

21. The cellular radar system of claim 20, further including a central processing system (31) connected, in a wireless and/or wired fashion, to the processing means (13) of the multistatic radar systems (10);

wherein the processing means (13) of the multistatic radar systems (10) are is configured to provide the central processing system (31) with detection/tracking data indicative of three-dimensional positions and velocities of targets (50, 71, 72, 73) detected and/or tracked by said processing means (13);

wherein the central processing system (31) is configured to carry out based on the detection/tracking data provided by the processing means (13) of the multistatic radar systems (10):

a target monitoring step including monitoring all of the plurality of targets (50, 71, 72, 73) detected and/or tracked by all the multistatic radar systems (10); and a cell handover step including managing handover of the detected and/or tracked targets (50, 71, 72, 73) between/among the multistatic radar systems (10).

22. The cellular radar system according to claim 20, wherein, for each cell (16, 60), the radar transmitter (11, 61) and receivers (12, 62, 63, 64, 65, 66, 67) of the respective multistatic radar system (10) installed in said cell (16, 60) are configured to operate based on a respective predefined transmission time and frequency pattern that is different from the predefined transmission time and frequency patterns used by the multistatic radar systems (10) installed in neighboring cells (16, 60).

23. The cellular radar system of claim 22, wherein, for each cell (16, 60), one or more of the radar receivers (12, 62, 63, 64, 65, 66, 67) of the respective multistatic radar system (10) installed in said cell (16, 60) are configured to operate based on:

the respective predefined transmission time and frequency pattern; and one or more predefined transmission time and frequency patterns used by one or more multistatic radar systems (10) installed in one or more neighboring cells (16, 60).

* * * * *